US009555390B2

(12) United States Patent
Krell et al.

(10) Patent No.: US 9,555,390 B2
(45) Date of Patent: Jan. 31, 2017

(54) SNAP-LOCK PACKING ELEMENT AND ASSEMBLY THEREOF FOR A CONTACT ASSEMBLY

(71) Applicant: Brentwood Industries, Inc., Reading, PA (US)

(72) Inventors: Timothy E. Krell, Mohrsville, PA (US); Frank M. Kulick, III, Leesport, PA (US); Scott Shoemaker, Boyertown, PA (US); Boris Yanovsky, Flemington, NY (US)

(73) Assignee: Brentwood Industries, Inc., Reading, PA (US)

( * ) Notice: Subject to any disclaimer, the term of this patent is extended or adjusted under 35 U.S.C. 154(b) by 72 days.

(21) Appl. No.: 14/717,297

(22) Filed: May 20, 2015

(65) Prior Publication Data

US 2015/0336080 A1    Nov. 26, 2015

Related U.S. Application Data

(60) Provisional application No. 62/001,183, filed on May 21, 2014.

(51) Int. Cl.
*B01F 3/04* (2006.01)
*B01J 19/32* (2006.01)
*C02F 3/10* (2006.01)

(52) U.S. Cl.
CPC ......... *B01J 19/32* (2013.01); *B01J 2219/3221* (2013.01); *B01J 2219/3222* (2013.01); *B01J 2219/3284* (2013.01); *B01J 2219/32231* (2013.01); *B01J 2219/32248* (2013.01); *B01J 2219/32262* (2013.01); *B01J 2219/32275* (2013.01); *B01J 2219/32286* (2013.01); *B01J 2219/32483* (2013.01); *C02F 3/101* (2013.01); *Y10T 29/49828* (2015.01)

(58) Field of Classification Search
CPC ... B01J 19/32; B01J 19/325; B01J 2219/3221; B01J 2219/32275; B01J 2219/3222; B01J 2219/32231; B01J 2219/32262; B01J 2219/32286; B01J 2219/32483; B01J 2219/3284; B01J 2219/32248; C02F 3/101; Y10T 29/49828
USPC ...... 261/108, 112.1, 112.2, DIG. 72; 29/450, 29/451, 453, 464, 467, 505
See application file for complete search history.

(56) References Cited

U.S. PATENT DOCUMENTS 3,281,307 A * 10/1966 Moeller .................... B01J 19/32
261/110
3,540,702 A * 11/1970 Kiyoshi .................... B01J 19/32
261/112.2

(Continued)

*Primary Examiner* — Charles Bushey
(74) *Attorney, Agent, or Firm* — Panitch Schwarze Belisario & Nadel LLP

(57) ABSTRACT

A packing element has components that form snap-lock connections with like packing elements used to form a contact assembly. The packing elements can be readily and easily assembled together using little force by connecting the packing elements with connectors in a snap-lock manner. The packing elements are retained by the snap-lock connectors in the contact assembly such that the packing elements cannot be separated without such force that the material forming at least one of components of the snap-lock connections or the packing element will fail to the extent that a contact assembly made using the packing elements would not be functional.

45 Claims, 12 Drawing Sheets

(56) References Cited

U.S. PATENT DOCUMENTS

| | | | | |
|---|---|---|---|---|
| 3,775,234 A * | 11/1973 | Rich | ............ | B21D 47/00 |
| | | | | 156/207 |
| 4,344,899 A * | 8/1982 | Monjoie | ............ | B01J 19/32 |
| | | | | 261/112.2 |
| 5,474,832 A * | 12/1995 | Massey | ............ | F28F 25/087 |
| | | | | 261/112.2 |
| 5,775,410 A * | 7/1998 | Ramm-Schmidt | ............ | B01D 1/22 |
| | | | | 165/110 |
| 6,096,407 A * | 8/2000 | Vodicka | ............ | B01J 19/32 |
| | | | | 261/112.2 |
| 6,544,628 B1 * | 4/2003 | Aull | ............ | B01J 19/32 |
| | | | | 261/110 |
| 7,637,485 B2 * | 12/2009 | Honnell | ............ | B01J 19/30 |
| | | | | 261/95 |
| 7,674,304 B2 * | 3/2010 | Krell | ............ | B01D 1/305 |
| | | | | 261/112.2 |
| 8,834,058 B2 * | 9/2014 | Woicke | ............ | B01J 19/32 |
| | | | | 24/662 |
| 8,844,136 B2 * | 9/2014 | Woicke | ............ | B01J 19/32 |
| | | | | 29/521 |

* cited by examiner

SNAP-LOCK PACKING ELEMENT AND ASSEMBLY THEREOF FOR A CONTACT ASSEMBLY

CROSS-REFERENCE TO RELATED APPLICATIONS

This application claims the benefit under 35 U.S.C. §119(e) of U.S. Provisional Patent Application No. 62/001,183, filed May 21, 2014, the disclosure of which is hereby incorporated herein by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a snap-lock packing element, a contact assembly made from snap-lock packing elements and methods of assembly of the snap-lock packing elements to make the contact assembly. More particularly, the invention relates to a snap-lock packing element that can be readily and easily assembled together using little force with like packing elements by connecting the packing elements with connectors in a snap-lock manner such that the packing elements cannot be separated without such force that the material forming at least one of components of the snap-lock connections or the packing element will fail to the extent that a contact assembly made using the packing elements would not be functional.

Packing elements are often used as contact assemblies or bodies in heat exchange apparatus such as cooling towers where gas, such as air is in contact with liquid, such as water, to provide heat exchange in systems where the gas and liquid typically flow countercurrent or crosscurrent to one another. Contact assemblies are also used in other industries where a contact between gases, liquids and even particulate solids are involved, such as gas scrubbers, as well as in water treatment facilities, such as in trickling filters, for example, where the contact assemblies support bacteria used in water treatment systems. Since the most common use for the packing elements of the present invention is likely to make contact assemblies for heat exchangers, the invention will primarily be described with such use in mind, although the packing elements and contact assemblies made from them are not to be limited only for heat exchange applications.

In the heat exchange industry, for example, such packing elements and contact assemblies or bodies made from them, are often referred to a "fill," "media" or "fill media." One type of fill media that has been sold by Brentwood Industries, Inc. the applicant of this patent application, is HTP-25™ splash fill media in its ACCU-PAC® fill media line, used in high temperature counterflow or cross-flow cooling towers. This is an injection-molded polypropylene copolymer fill media that produces heat transfer by way of integral splash or drip points in a compact module, assembly or body made of connected, corrugated lattice packing elements. The highly engineered splash design formed using the lattice packing elements provides maximum thermal performance. The open lattice, offset flute, corrugated packing elements are fouling-resistant that is excellent for use in environments and systems where the circulating water has very high levels of suspended solids.

The HTP-25™ fill media is commercially successful and provides many advantages in cooling tower environments, partially attributable to the strength of the contact assembly or body formed from the packing elements using a very secure mechanical assembly or fastening technique, rather than using solvents or adhesives that are a less environmentally friendly way of securing together the packing elements to make the contact assemblies. The mechanical fastening technique used for this type of fill media involves inserting relatively long cylindrical projections extending from one packing element through mating holes in an adjacent packing element. Once a projection has been inserted through a hole, the projection is then mechanically deformed using various types of crimping tools to form an expanded head on the projection, such that the deformed projection acts as a flattened rivet with a top plan size larger than the hole diameter, by which the expanded head cannot be retracted through the hole, retaining the packing elements together. This produces a very strong contact body or contact assembly.

The present invention is an improvement over the current HTP-25™ splash fill media, where the same materials and general lattice packing elements or contact sheets can be used, but with the snap-lock connectors of the present invention the packing elements are able to be formed very easily and readily in the field by hand without apparatus including crimping tools previously required to form the projections into flattened rivets. With the present invention, either no apparatus is needed or a simple fixture having a base plate and a plurality of alignment rods can be used where the alignment rods pass through alignment holes in adjacent packing elements. The resulting contact assembly made by connecting the packing elements is still so strong that the connecting members of the snap-lock connections would be rendered dysfunctional or useless, or the material of the packing elements would, in essence, be destroyed, if the packing elements were attempted to be separated from each other after the snap-lock connections are formed.

When not assembled to form a contact assembly or contact body, the packing elements of the HTP-25™ splash fill media can nest together for storage and shipment, but the nesting height is relatively high because of the height of the projections that are required to be flattened to form the couplings into flattened rivets. In the current embodiment of the HTP-25™ splash fill media, the packing elements can stack and nest together for storage and shipment, but the nesting height from the bottom of one lower packing element to the bottom of the next adjacent upper packing element is 0.227 inch (5.766 mm). This corresponds with a nesting height of about 48 packing elements per foot (30.38 cm). Since storage of the packing elements requires an adequate amount of volume, and shipping also may be based at least in part on volume, it is desired to have a lower nesting height for packing elements of otherwise identical dimensions. The packing element of the present invention, which are connectable together into a contact assembly in a snap-lock manner, has a significantly lower unassembled stacking or nesting height compared to packing elements of the same dimensions, other than the type of connector, currently used for the HTP-25™ splash fill media. This provides a considerable saving of storage space and shipping costs for the packing elements of the present invention.

Another advantage of the present invention is that the injection molding tool used to form the packing elements does not require moving parts. The snap-lock connection of the present invention includes a post member having a cap with legs and undercut bottom edges, as explained below. These undercut bottom edges are designed to be formed by fixed mold protrusions that extend from the opposite side of an injection mold to the undercut areas so that the injection molding operation can be performed more easily, including merely opening the mold to release the packing element including the post member with complex undercut geometries. Mold cavity parts moving in the plane of the tool face are typically used to create complex geometries with undercut areas in general, where traditional cantilever undercut connections are present. Such moving parts are not necessary to mold the undercut bottom edges of the post member cap in the present invention. Therefore, the cost of the tool is reduced over a tool having moving or mechanical features that operate in a plane parallel to the tool face.

BRIEF SUMMARY OF THE INVENTION

One aspect of the present invention relates to a packing element for a contact assembly made from a plurality of packing elements, each packing element comprising: a lattice packing element of material having a first major face and an opposed major face, a first side with a first side edge and an opposed second side with a second side edge, a first end with a first end edge and an opposed second end with a second end edge; a plurality of corrugations, each having a length formed in the major faces extending at least partially from the first side toward the second side, each corrugation having a peak and a valley joined by angled side walls, the peak having a first peak face corresponding to the first major face and a second peak face opposed to the first peak face and corresponding to the second major face, the valley having a first valley face corresponding to the first major face and a second valley face opposed to the first valley face and corresponding to the second major face; at least some of the peaks having at least one post member formed on and extending from the first peak face in a direction away from the first major face and at least some of the valleys having at least one segmented truncated dome member formed on and extending from the second valley face toward the first valley face, the post member of a peak being alignable with the segmented truncated dome member of an adjacent valley in an adjacent packing element when one packing element is rotated 180° around an axis perpendicular to the major faces of the packing element compared to the adjacent packing element to form a contact assembly from the packing elements; the post member comprising a plurality of angled legs spaced from each other extending from the first peak face to a cap, the cap having a top face, side edges and undercut bottom edges between the legs; the segmented truncated dome member having a central opening surrounded by a plurality of spaced dome segments formed by angled protrusions extending from the second valley face toward the first valley face, each of the angled protrusions of the segmented truncated dome member having a top edge, the plurality of the dome segments being equal to a number of spaces between the angled legs of the post member, the angled protrusions of the segmented truncated dome member having locations corresponding to locations of the spaces between the legs of the post member; the legs of the post member having a length sufficient for the post member and its cap to extend through the central opening of the segmented truncated dome member of an adjacent packing element when appropriately aligned therewith to such an extent that the undercut bottom edges of the cap may bear against the top edges of the angled protrusions of an aligned segmented truncated dome member of an adjacent packing element in a snap-lock manner to retain the adjacent packing elements together as a contact assembly such that a force needed to separate a post member inserted into a segmented truncated dome member in the snap-lock manner is so great that the material forming at least one of the post member, the segmented truncated dome member or the packing element will fail to the extent that a contact assembly made using the packing elements would not be functional.

Another aspect of the present invention relates to a contact assembly made from a plurality of such packing elements as just described. In the contact assembly, each packing element is aligned with an adjacent packing element by being rotated 180° around an axis perpendicular to the major faces of the packing element compared to the adjacent packing element, the adjacent packing elements being attached to each other when at least some of the post members of one packing element are inserted into aligned segmented truncated dome members of the adjacent packing element and retained together in a snap-lock manner to form the contact assembly.

Still another aspect of the present invention relates to a method of making the contact assembly comprising a plurality of packing elements as just described, the method comprising: providing a plurality of the packing elements; aligning the packing elements such that adjacent packing elements are rotated 180° around an axis perpendicular to the major faces with respect to the adjacent packing elements; and inserting at least some of the post members of one packing element into aligned segmented truncated dome members of the adjacent packing element whereby the post members inserted into aligned segmented truncated dome members are retained together in a snap-lock manner, thereby forming the contact assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DEFINITIONS

Figure 1:
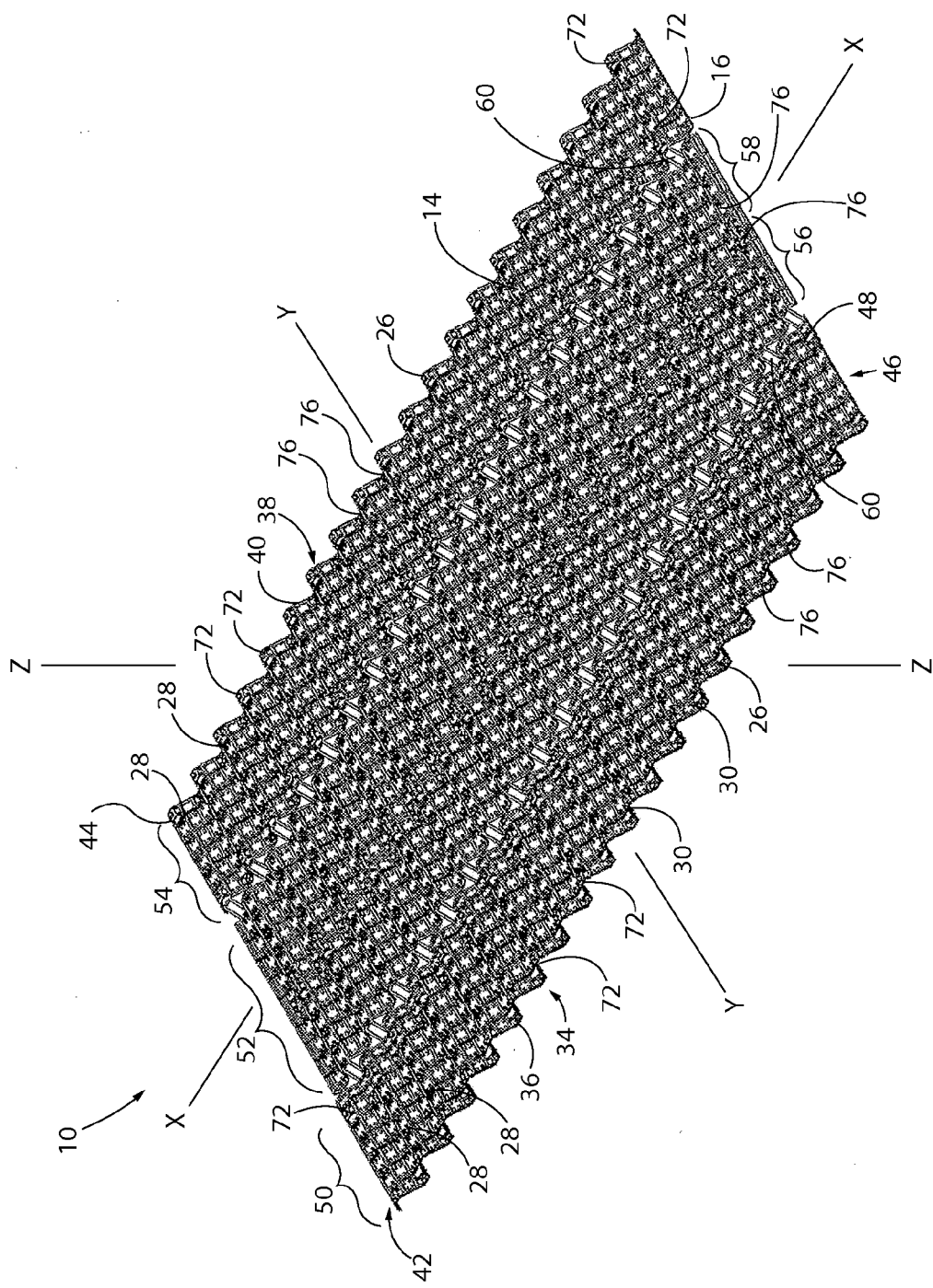
FIG. 1 is an isometric view of one embodiment of a packing element according to the present invention, where, for the sake of convenient explanation, the packing element is shown in a position lying flat prior to being assembled with like packing elements to form a contact assembly.

In addition to the definitions set forth elsewhere herein, the following definitions relate to the invention described and claimed in this application.

As used herein, the singular forms "a", "an", and "the" include plural referents, and plural forms include the singular referent unless the context clearly dictates otherwise.

Certain terminology is used in the following description for convenience only and is not limiting. Words designating direction such as "bottom," "top," "front," "back," "left," "right" "upper," "lower," "sides" and "ends" designate directions in the drawings to which reference is made, but are not limiting with respect to the orientation in which the packing elements or contact assembly of the present invention may be used. The terminology includes the words specifically mentioned above, derivatives thereof and words of similar import.

As used herein, the term "about" with respect to any numerical value, means that the numerical value has some reasonable leeway and is not critical to the function or operation of the component being described or the system or subsystem with which the component is used, and will include values within plus or minus 20% of the stated value.

As used herein, the term "generally" or derivatives thereof with respect to any element or parameter means that the element has the basic shape, or the parameter has the same basic direction, orientation or the like to the extent that the function of the element or parameter would not be materially adversely affected by somewhat of a change in the element or parameter. By way of example and not limitation, an element that may be described as "generally perpendicular to" or another element can be oriented a few degrees more or less than exactly 90° with respect to perpendicular, and an element that may be described as "generally trapezoidal" has a shape like a trapezoid with a shorter top and oppositely angled sides with or without an actual base that is longer than to top, where such variations do not materially adversely affect the function of the packing element or component thereof or the contact assembly formed therefrom.

As used herein, the term "substantially" with respect to any numerical value or description of any element or parameter, including the relationship of the packing elements or their components within the contact assembly, means sufficiently close to the precise value, parameter or relationship to be within reasonable industrial manufacturing tolerances and use conditions that would not adversely affect the function of the element or parameter or apparatus containing it. By way of example and not limitation, with respect to the relationship of components of the post members to the dome members to be explained hereinafter, "undercut bottom edges of the cap are angled to be substantially perpendicular to the angle of the protrusions" expresses that even if the angle is not exactly 90°, the angle is close enough, such as allowing for variations in manufacturing and use conditions, that it would not materially adversely affect performance, such that the snap-lock connection would still be effective to positively maintain the packing elements together in a contact assembly of the present invention.

As used herein, where specific dimensions are presented in inches or other English units and parenthetically in millimeters (mm) or other metric units, the dimensions in English units controls, as the metric unit equivalents are converted from the English units; for example, the millimeter dimensions were calculated based on the inches dimensions by multiplying the inches dimensions by a factor of 254 mm per inch and rounding the millimeter dimensions to no more than three decimal places.

DETAILED DESCRIPTION OF THE INVENTION

One exemplary embodiment of a packing element according to the present invention, generally identified as 10, and its counterparts 10a, 10b to as many as desired generically identified as 10n in a contact assembly 12 formed from the packing elements, are shown in FIGS. 1 through 4. The packing element is in the form a lattice packing element, typically made by injection molding a suitable material, such as polypropylene, polyethylene, polyvinyl chloride, or any number of copolymers, for example, depending on the use and environment of the contact assembly 12 made from the packing elements 10. When the contact assembly is used as heat exchange fill media, such as in a counterflow or cross-flow cooling tower, where water flows downward and air is drawn or forced respectively upward or across the contact assembly, a polypropylene-polyethylene copolymer is a preferred material.

Figure 2:
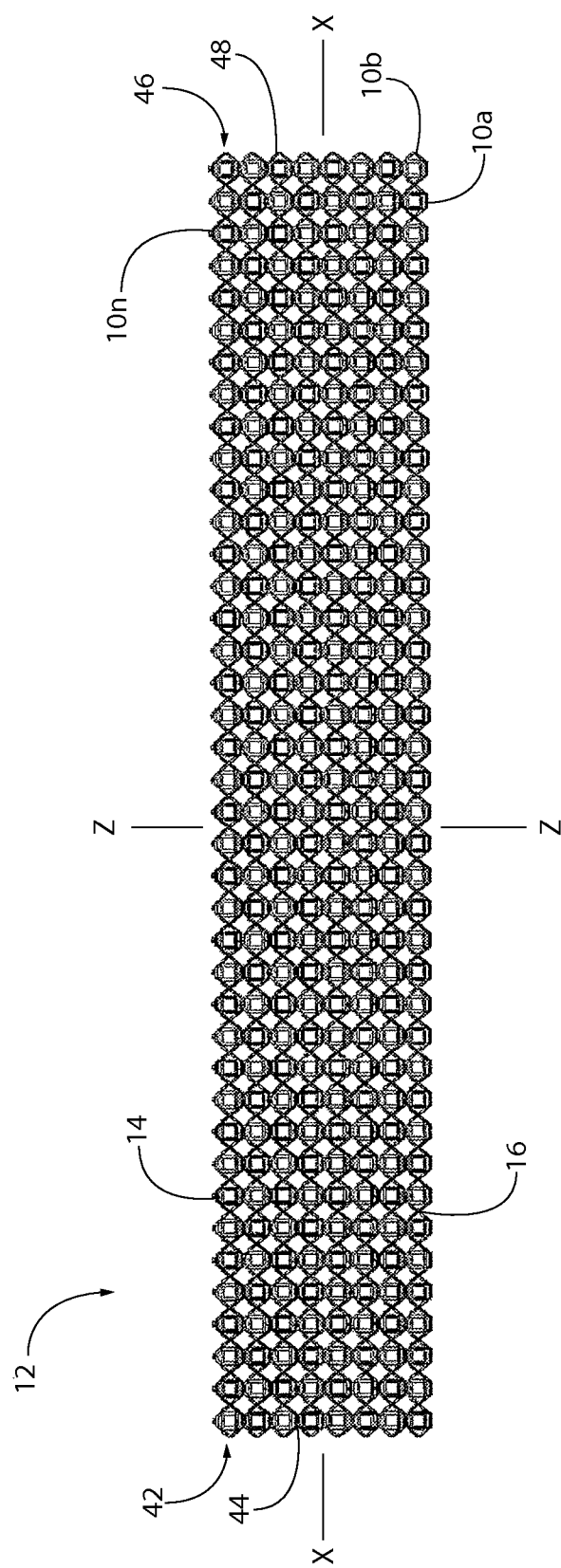
FIG. 2 is a side elevation view of one embodiment of a contact assembly according to the present invention made from a plurality of the packing elements of FIG. 1.
Figure 3:
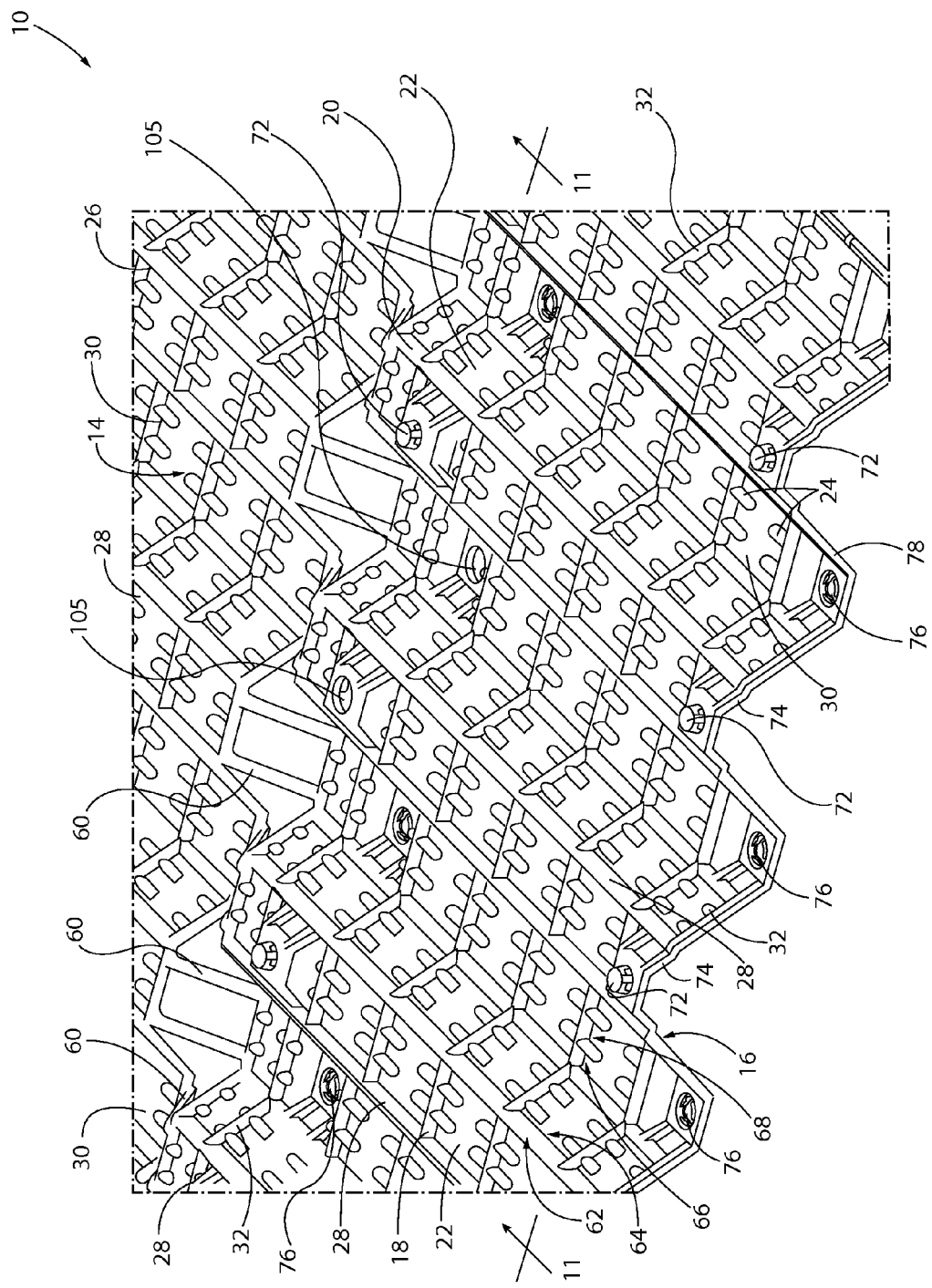
FIG. 3 is an isometric view of a portion of the embodiment of the packing element shown in FIG. 1, including a portion of one side edge, that is enlarged to show details of the packing element.
Figure 4:
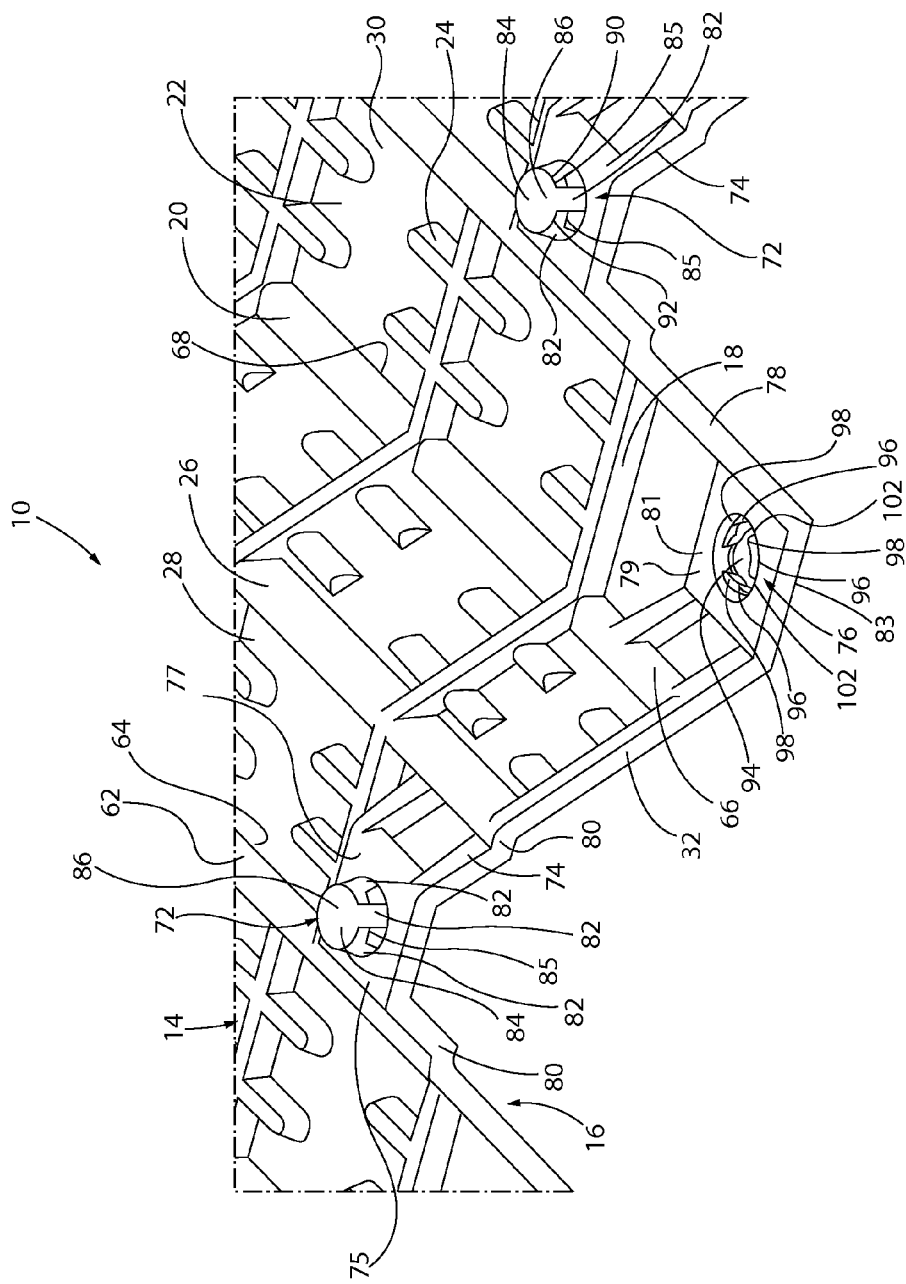
FIG. 4 is an isometric view of a portion of the embodiment of the packing element shown in FIGS. 1 and 3, including a portion of one side edge, that is enlarged to show details of an exemplary post member and an exemplary dome member of packing element.

The lattice packing element 10, as best seen in FIGS. 3 and 4, has a first major face 14, corresponding to the entire visible surface of the packing element 10, shown as a top surface in the orientation shown in FIG. 1, and an opposed second major face 16, corresponding to the entire bottom surface of the packing element 10 that is not visible in FIG. 1. The lattice packing element is formed by intersecting members, and may and preferably does include longitudinal members 18 that may be generally parallel to a longitudinal axis x-x as shown in FIGS. 1 and 2 and transverse members 20 that may be generally parallel to a transverse axis y-y as shown in FIG. 1. The longitudinal and transverse members may form cells 22. In a preferred embodiment, such as for heat exchange fill media in cooling tower, for example, a plurality of drip or splash bars 24 may extend from the longitudinal members 18, as shown best in FIGS. 3 and 4, or perhaps the transverse members 20 or even the intersections of the longitudinal and transverse members. Water used in cooling towers drips from or splashes off of the bars 24 to intermix with the air and provide the desired cooling. There is no required arrangement or orientation of the intersecting members, such as longitudinal members 18 and transverse members 20, or components that form the lattice of the packing elements 10, except for the snap-lock connection components described below. The number, orientation and arrangement of the components of the basic lattice structure may be as desired as best suited for an intended use of the contact assembly 12 made from the packing elements.

The contact assembly 12 made from the packing elements 10 is shown in FIG. 2 in an orientation typically involved in assembling the contact assembly by stacking the packing elements with the first major face 14 of one packing element, say, packing element 10a adjacent to the opposed second major face 16 of the next subsequent adjacent packing element, say, packing element 10b, on top of each other in a particular orientation as explained in detail below, such that the packing elements are retained together in a snap-lock manner. The contact assembly 12 is shown in FIG. 2 in the same orientation as the orientation of the packing element 10 in FIG. 1, namely with the opposed first and second major faces 14 and 16 substantially horizontal, for clarity of explanation. In the orientation shown in FIGS. 1 and 2, the packing element 10 and the contact assembly 12 each has the same axis z-z that is perpendicular to the respective first and second major faces 14 and 16. However, at least when the contact assembly is used as heat exchange fill media in a cooling tower, the orientation of the contact assembly is different. For such a use, the contact assembly 12 would be rotated around axis x-x as shown in FIG. 2, such that the packing elements 10 used to make the contact assembly would have their first sides 34 on the top, for example, and their second sides 38 on the bottom, for example, of the contact assembly 12. Alternatively, for such use as heat exchange fill media, the first sides 34 of the packing elements could be on the bottom and the second sides 38 of the packing elements could be on the top of the contact assembly.

The packing elements also include corrugations 26, sometimes also referred to as flutes. The corrugations have peaks 28 formed by some cells 22 and valleys 30 formed by other cells 22, where the peaks 28 and valleys 30 are joined by side walls 32 formed by still other cells 22. The corrugations can extend in any direction or orientation within the packing element 10, continuously or discontinuously, such as from a first side 34 having a first side edge 36 at least partially toward a second side 38 having a second side edge 40. The corrugations can be formed in a uniform or non-uniform wave at least partially or preferably entirely between a first end 42 having a first end edge 44 and a second end 46 having a second end edge 48. Instead of the corrugations 26 being generally perpendicular to the side edges 34 and 38 of the packing element 10, the corrugations may be angled obliquely with respect to such side edges. Moreover, it is not necessary that all of the corrugations be substantially parallel to each other as shown.

In an exemplary embodiment shown in the drawings, the packing element 10 has several sections from the first side 34 to the second side 38, namely a first section 50, a middle section 52 and a second section 54. The middle section 54 is shown as having two subsections 56 and 58 on opposite sides of the packing element longitudinal axis x-x. The packing element can have any desired dimension limited only by the size of the injection mold used to make it and the ability to handle it and form a contact assembly from a number of packing elements. A typical dimension for the embodiment shown in FIG. 1 is about two feet (about 61 cm) from the first side edge 36 to the second side edge 40 by about four feet (about 122 cm) from the first end edge 44 to the second end edge 48. After molding, the packing element may be cut from the first end edge 44 to the second end edge 48 along the longitudinal x-x axis to form two packing elements each having dimensions of about one foot (about 131 cm) by about four feet (about 122 cm), if space is an issue for a particular application for contact assemblies made from the packing elements.

In the embodiment shown in FIGS. 1-4, and as best seen in FIG. 1 and only partially in FIG. 3, the sections of the packing element may have different, that is, offset, inverted or alternating corrugations or flutes. Thus, the corrugations 26 in the first section 50 may start with peaks 28 in the first major face 14 that become offset or inverted or alternating as valleys in the first major face 14 in the middle section 52, and end as peaks 28 again in the first major face 14 in the second section 54. The offset, inverted or alternating peaks and valleys along the length of the corrugations 26 in the different sections are joined by offsetting transition connectors 60 between the ends of the alternating peaks 28 and the ends of the valleys 30 along the length of the corrugations 26. Where there are offset, inverted or alternating corrugations 26 as shown in the embodiments of FIGS. 1-4, the corrugations 26 in the different sections can have different lengths, so that when the packing elements are joined together to form contact assemblies 12, as explained below, the offsetting transition connectors 60 are not all aligned with each other. If the offsetting transition connectors 60 were aligned with each other areas of weakness may result for a contact assembly containing the packing elements. It is important when the packing elements are formed into contact assemblies that at least some, and preferably at least a majority, of the components forming the snap-lock connections are aligned to retain the packing elements together to form and retain the contact assembly as a functioning module.

The peaks 28 have a first peak face 62 corresponding to the first major face 14 of the packing element 10 and an opposed second peak face 64 corresponding to the second major face 16 of the packing element 10. Similarly, the valleys 30 have a first valley face 66 corresponding to the first major face 14 of the packing element 10 and an opposed second valley face 68 corresponding to the second major face 16 of the packing element 10.

Figure 5:
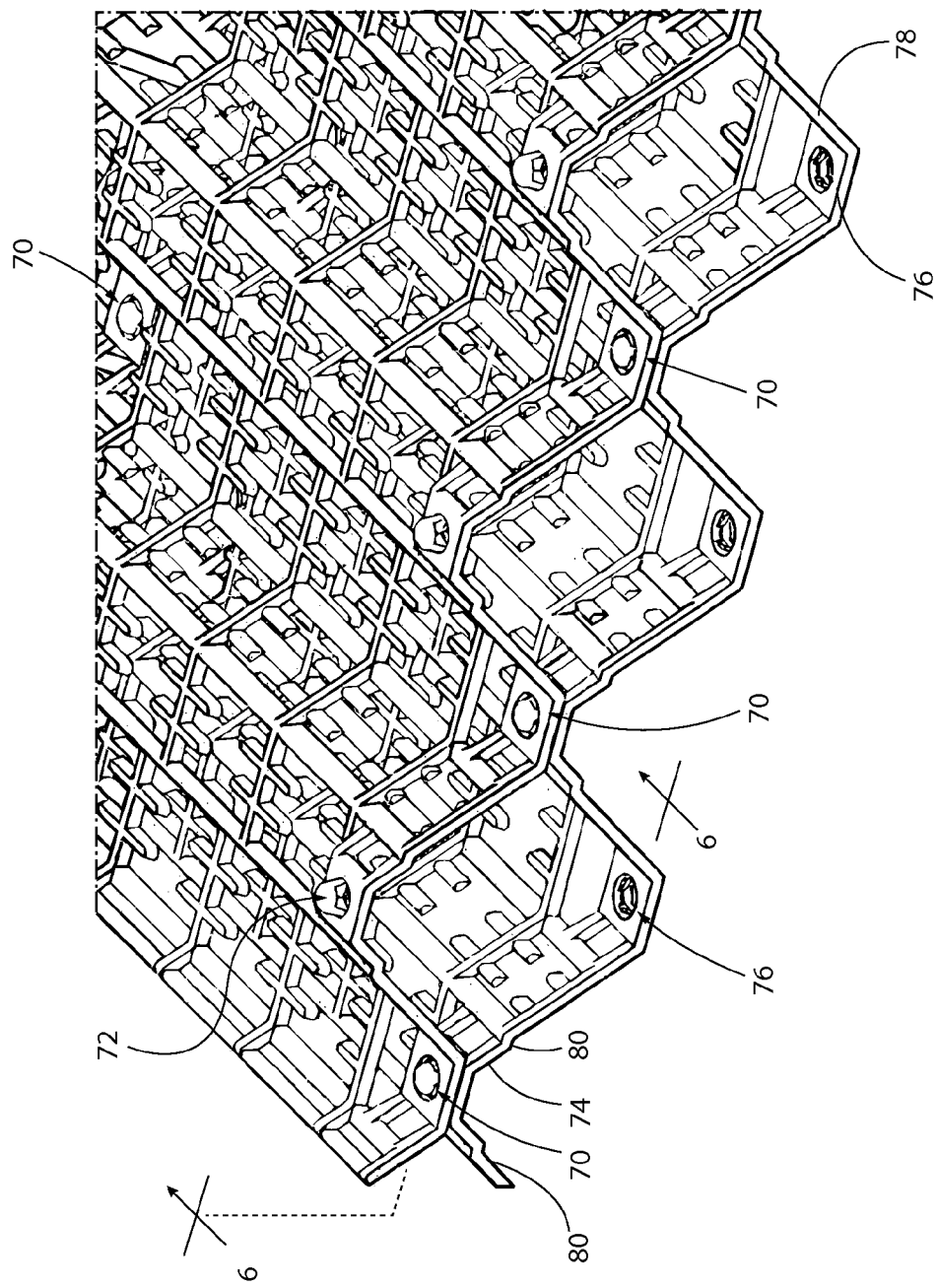
FIG. 5 is an isometric view of a portion of a contact assembly of the type shown in FIG. 2, but showing only two packing elements for the sake of clarity, including one corner of the contact assembly, that is enlarged to show details of the assembly of the packing elements together by which the post members and dome members are interconnected in a snap-lock manner.
Figure 6:
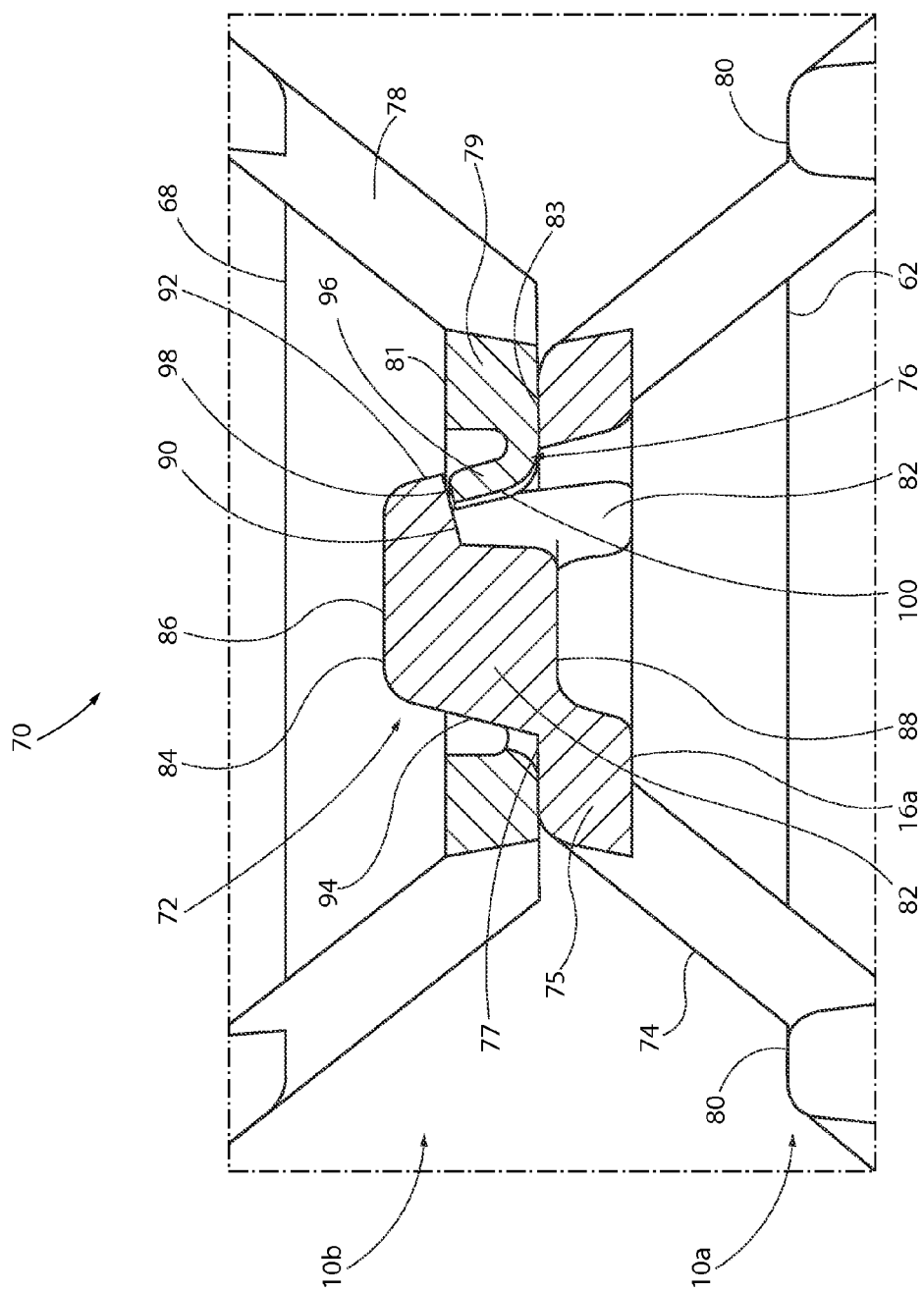
FIG. 6 is a greatly enlarged vertical cross-sectional view along lines 6-6 of FIGS. 5 and 9, through a snap-lock connection to show details of one embodiment of the post member and the dome member and their proper interconnection.
Figure 9:
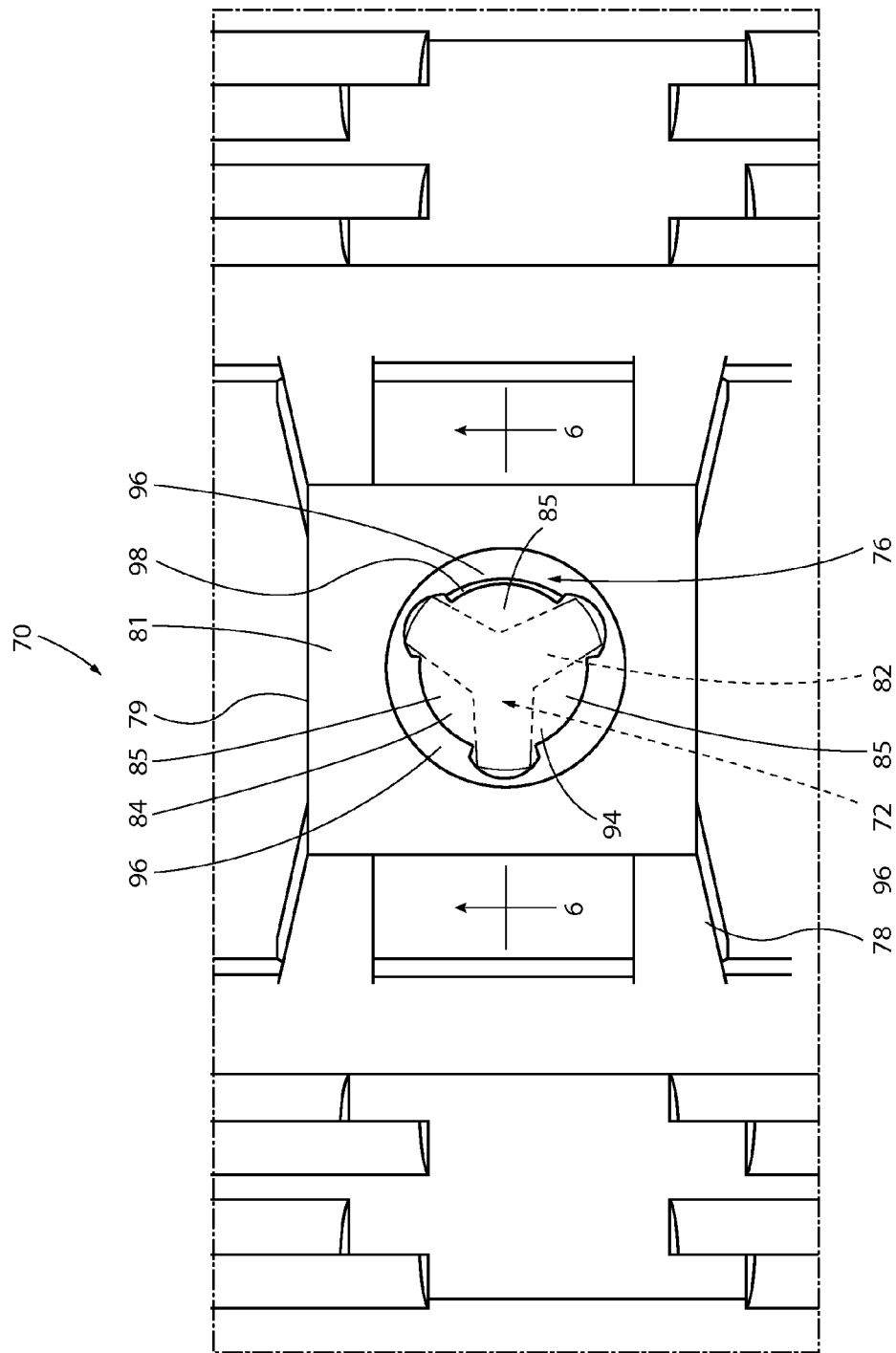
FIG. 9 is a greatly enlarged top plan view of the snap-lock connection of the post member and the dome member embodiment as shown in FIG. 6.

The packing elements 10 are retained together to form a contact assembly 12 using snap-lock connectors 70 best shown in FIGS. 5, 6 and 9. The snap-lock connector 70 comprises a post member 72 that preferably, but not necessarily, extends from a generally trapezoidal prismatic peak extension 74 extending from the first peak face 62, as well as a segmented truncated dome member 76, sometimes referred to herein merely as a "dome member" for convenience, that preferably, but not necessarily, extends from a generally trapezoidal prismatic valley extension 78 extending from the second valley face 68. The generally trapezoidal prismatic peak extension 74 has a shorter surface portion 75 that preferably, but not necessarily is flat, with a peak face 77 corresponding to the peak face 62 of the peak 28 of the corrugation 26 and to the first major face 14 of the packing element. The generally trapezoidal prismatic peak extension 74 preferably extends from the first peak face 62 of the peak 28 in an offset manner indicated by the shoulders 80 extending inwardly from the side walls 32 of the corrugations 26, although this inwardly offset arrangement is not necessary for the structure or function of the packing element, such that the angled walls of the generally trapezoidal prismatic extension 74 may be merely a continuation of the angled walls 32 connecting the peaks 28 and the valleys 32, when such generally trapezoidal prismatic extensions 74 are used. The inwardly offset arrangement allows less material to be used to make the smaller generally trapezoidal prismatic extensions. Multiplied by the relatively large number of snap-lock connections 70 that typically are present in a packing element 10, even a small material saving per connection adds up, reducing material cost and weight of the packing elements, and therefore shipping costs.

The generally trapezoidal prismatic valley extension 76 has a shorter surface portion 79 that preferably, but not necessarily is flat, with a first shorter surface portion face 81 corresponding to the first valley face 66 of the valley 30 of the corrugation 26 and to the first major face 14 of the packing element, and a second shorter surface portion face 83 corresponding to the second valley face 68 of the valley 30 of the corrugation 26 and to the second major face 16 of the packing element.

With reference to FIGS. 1 and 3, to form the snap-lock connections 70 when a plurality of packing elements 10 are assembled together, there are a plurality of post members 72, each preferably, but not necessarily, on a generally trapezoidal extension 74 located throughout the packing elements, along corrugations 26 and preferably the peaks 28 of the corrugations. Likewise, there are a plurality of segmented truncated dome members 76, each preferably, but not necessarily, on a generally trapezoidal extension 78 located throughout the packing elements, along corrugations 26 and preferably the valleys 30 of the corrugations. The post members 72 and the dome members 76 are located on the packing element such that at least some of the post members will be aligned with at least some of the dome members to form snap-lock connections when adjacent packing elements are assembled into a contact assembly 12 as described below.

When the post members 72 and the dome members 76 are not formed on the respective generally trapezoidal prismatic extensions 74 and 78, the post members and dome members may be formed from solid portions (not shown) between the longitudinal members 18 and the transverse members 10 forming the lattice packing element 10. The formation of the post members 72 and the dome members 76 on the respective generally trapezoidal prismatic extensions 74 and 78 is preferred, particularly when the contact assembly 12 made from the packing elements 10 is used as filler media in a cooling tower, so that there is good spacing of the drip bars 24 and other contact surfaces of adjacent packing elements within the contact assembly to provide for effective heat transfer.

There should be a sufficient number of post members 72 and dome members 76 alignable together to securely retain the packing elements together in a contact assembly 12. Preferably, at least some of the peaks 28 have at least one post member formed on and extending from the first peak face 62, each post member more preferably extending from a generally trapezoidal prismatic peak extension 74 that in turn extends from the first peak face 62. At least some of the valleys 30 have at least one segmented truncated dome member 76 formed on and extending from the second valley face 68, each segmented truncated dome member more preferably extending from a generally trapezoidal prismatic valley extension 78 that in turn extends from the second valley face 68. Also more preferably, at least some of the peaks 28 have at least two post members 72 separated along the length of the corrugation 26 and at least some of the valleys having at least two segmented truncated dome members 76 separated along the length of the corrugation.

Even more preferably, two post members 72 are formed on every peak 28, each post member preferably being formed on respective generally trapezoidal prismatic peak extensions 74, where one post member is adjacent the first side edge 36 and another post member is adjacent the second side edge 40 and on peaks from the first end 42 to the second end 44 of the packing element 10. Likewise even more preferably, two segmented truncated dome members 76 are formed on every valley 30, each segmented truncated dome member preferably being formed on respective generally trapezoidal prismatic valley extensions 78. One such dome member 76 is adjacent the first side edge 36 and another such dome member 76 is adjacent the second side edge 40 and on valleys 30 from the first end 42 to the second end 44 of the packing element 10.

Preferably, at least one, and more preferably, at least two additional post members 72 are formed on every peak 28, preferably on respective generally trapezoidal prismatic peak extensions 74, at least in one location along the length of the corrugations 26 between the post members adjacent the side edges of the packing element 10. Preferably, at least one, and more preferably, at least two additional dome members 76 are formed on every valley 30, preferably on respective generally trapezoidal prismatic valley extensions 78, at least in one location along the length of the corrugations 26 between the dome members adjacent the side edges of the packing element 10.

In all of the foregoing described embodiments of the packing elements 10 having a plurality of post members 72 and a plurality of dome members 76, the location of the post members and the dome members are formed in and located on the packing element so that at least some, preferably a majority, and more preferably, a very large majority of the post members 72 will be aligned with a respective amount of at least some, preferably a majority and more preferably, a very large majority of the dome members 76 when the packing elements 10 are formed into contact assemblies 12 as explained in more detail below.

The post member 72 comprises a plurality of angled legs 82 spaced from each other and extending from a solid portion (not shown) of the first peak face 62 between the longitudinal members 18 and the transverse members 20 wherever a post member 72 is desired, to a cap 84. Preferably, the post member 72 comprises a plurality of angled legs 82 spaced from each other and extending from the peak face 77 of the shorter surface portion 75 of the generally trapezoidal prismatic peak extension 74 to the cap 84. The angled legs preferably extend at an angle of about 30° to about 80°, and more preferably about 75°, with respect to a plane corresponding to the first peak face 62 of the solid portion of the packing element or preferably to a plane corresponding to the peak face 77 of the shorter portion 75 of the generally trapezoidal prismatic peak extension 74. Preferably, the legs 82 are spaced evenly around the periphery of the cap 84, but in a particular orientation such that the angled legs only fit into spaces between dome segments of the segmented truncated dome member 76 when the post member of one packing element is properly oriented with the segmented truncated dome member of an adjacent packing element, such as described below. More preferably, there is an odd number of angled legs to assure appropriate alignment with components of the dome member 76 as described below. Even more preferably, there are three angled legs 82 that are spaced preferably evenly, at about and more preferably substantially 120° on center of each leg, around the periphery of the cap 84, which, preferably, but not necessarily, is circular in a top plan view. Spaces 85 between the legs 82 are best shown in FIGS. 4 and 9.

As best shown in FIGS. 4, 6 and 9, the cap 84 has a top face 86, a lower surface 88, undercut bottom edges 90 between the legs 82 and side edges 92. The undercut bottom edges 90 are angled so as to be substantially perpendicular or slightly less than perpendicular with respect to the side edges 92. This allows the undercut bottom edges to assure that the post member 72 will be positively and securely attached to the segmented truncated dome member 76 in a snap-lock manner when adjacent packing elements are assembled into a contact assembly 12 as explained in more detail below.

The segmented truncated dome member 76 has a central opening 94 surrounded by a plurality of spaced dome segments in the form of angled protrusions 96. The angled protrusions 96 extend from the second valley face 68 toward the first valley face 62 of a solid portion (not shown) of a valley between the longitudinal members 18 and the transverse members 20 wherever a segmented truncated dome member 76 is desired. Preferably, the angled protrusions 96 extend from the second face 83 of the shorter surface portion 79 of the generally trapezoidal prismatic valley extension 78 toward the first face 81 of the shorter surface portion 79 of the generally trapezoidal prismatic valley extension 78. The angled protrusions 96 are angled about 30° to about 80°, and preferably, about 50° to about 75° with respect to a plane corresponding to the solid portion of a second valley face 68 or preferably to a plane corresponding to the second face 83 of the shorter surface portion 79 of the generally trapezoidal prismatic valley extension 78 when measured along an inside wall 100 of the angled protrusions 96.

Each angled protrusion 96 has a top edge 98 that is substantially perpendicular or slightly greater than perpendicular with respect to the angled protrusion 96, and more particularly with respect to the inside wall 100 of the angled protrusion 96. The angled protrusions 96 are preferably recessed within the solid portion of the valley solid portion, and more preferably are recessed within the shorter section 79 of the generally trapezoidal prismatic valley extension 78 such that the top edges 98 of the angled protrusions do not extend past the first valley face 81 of the generally trapezoidal extension 78. This recessed structure provides unassembled packing elements 10 when stacked and nested for storage and shipment a lower nesting height than if the top edges 98 of the angled protrusions 96 were to extend beyond the first valley face 81.

The plurality of dome segments or angled protrusions 96 of the segmented truncated dome member 76 equals the number of spaces 85 between the legs 82 of the post member 72, and are spaced from each other by spaces 102. The spaces 102 have a cross-sectional dimension, shown in FIGS. 3, 4 and 9 as a horizontal cross-sectional dimension, that is slightly larger than a similar cross-sectional dimension of the legs 82 under the cap 84 of the post member 72, such that when adjacent packing elements 10 and the post members 72 and dome members 76 are properly aligned to form a contact assembly 12, upper portions of the legs 82 just below the cap 86 are retained tightly in the spaces 102, as best seen in FIG. 9 abutting the corners of adjacent angled protrusions 96. Thus, the angled protrusions 96 have locations corresponding to locations of the spaces 85 between the legs 82 of the post member 72. While the number and spacing of the angled protrusions 96 of the dome member 76 are chosen so that the spaces 102 align appropriately with the legs 82 of the post member 72, however many there may be and whatever their spacing, it is presently preferred that there be an odd number of angled protrusions 96 and spaces 102 of the dome member 76 matching the preferred odd number of angled legs 82 and spaces 85 of the post member 72 to assure appropriate alignment of the components of the post members 72 and the dome members 76 as described above. Even more preferably, there are three angled protrusions 96 spaced evenly, at about and more preferably substantially 120° on center around the periphery of the central opening 94, which, preferably, but not necessarily, is circular in a top plan view. As explained below in more detail with reference to FIGS. 7 and 8, to assure proper orientation of the packing elements 10 when formed into a contact assembly 12 using the snap-lock connections 70 of the present invention, the orientation of the legs 82 and the spaces 85 between the legs of the post members 72, on the one hand, must be coordinated with the respective spaces 102 and the angled protrusions 96 of the segmented truncated dome members, on the other hand. By having the proper coordination of these components of the post members and the dome members, proper alignment and orientation of the packing elements 10 is assured in the contact assembly 12.

In view of the relationship of the components of the post members 72 and the dome members 76, when a snap-lock connection 70 is formed between properly aligned adjacent packing elements 10 to form a contact assembly 12, the undercut bottom edges 90 of the cap 84 may bear against the top edges 98 of the protrusions of an aligned segmented dome member of an adjacent packing element in a snap-lock manner to retain the adjacent packing elements 10 together as a contact assembly 12 such that a force needed to separate a post member 72 inserted into a dome member 76 in the snap-lock connection is so great that the material forming at least one of the post member, the dome member or the packing element will fail to the extent that a contact assembly 12 made using the packing elements 10 would not be functional.

FIG. 6 is a greatly enlarged vertical cross-sectional view along lines 6-6 of FIGS. 5 and 9, through a preferred snap-lock connection 70, showing details of one embodiment of the post member 72 as properly aligned with the dome member 76, and their proper interconnection to form a contact assembly of two packing elements 10a and 10b. Only one angled leg 82 of the post member 72 is shown in vertical cross-section, and only one angled protrusion 96 forming one segment of the segmented truncated dome member 76 is shown in vertical cross-section for clarity of illustration and explanation. Of note in FIG. 6 is that the lower surface 88 of the cap 84 of the post member 72 is indented or located above the second major face 16a of the shorter surface portion 75 of the generally trapezoidal prismatic peak extension 74 that corresponds to the second major face 16 of the packing element 10a in the orientation of FIG. 6. This is to allow a cap 84 of an adjacent stacked or nested packing element to fit into the cavity formed by the lower surface 88 and the side walls of the flat portion 75 of the generally trapezoidal prismatic peak extension 74 when the packing elements are stacked or nested for storage or shipment as shown and explained below regarding FIG. 11, rather than when adjacent packing elements 10 are assembled into a contact assembly 12.

FIG. 6 also shows details of the relationship between the undercut bottom edges 90 below the cap 84 and between the legs 82 of the post member 72 with respect to the top edges 98 of the angled protrusions 96 forming the dome segments of the segmented truncated dome member 76. The undercut edges 90 form an angle that is substantially perpendicular or slightly less than perpendicular with respect to the side edges 92 of the cap 84. The top edges 98 form an angle that is substantially perpendicular or slightly greater than perpendicular with respect to the angled protrusions 96, and more specifically with respect to the inside wall 100 of the angled protrusions. While both of the indicated angles may be substantially perpendicular, preferably only one of the angle between the undercut edges 90 and the side edges 92 on the one hand, and the angle between the top edges 98 and the angled protrusions 96 on the other hand need be slightly less than perpendicular and slightly greater than perpendicular, respectively, so long as the other of the angle between the undercut edges 90 and the side edges 92 on the one hand, and the angle between the top edges 98 and the angled protrusions 96 on the other hand is perpendicular. The slightly off-perpendicular angles are preferred but may not be essential, so that any force exerted by the undercut bottom edges 90 of the cap 84 of the post member 72 to separate the post member when retained in the dome member 76 in a snap-lock connection 70 will either be directed through the angled protrusions 96 along at the angle of the protrusions, or if any deflection of the protrusions 96 result from such attempted separation of the packing elements 10a from 10b, the respective slightly less than perpendicular or the slightly greater than perpendicular angles will cause the protrusions 96 to tend to move toward and against the legs 82 of the post member 72 (see the leg 82 not in cross-section in FIG. 6, against which the inside wall 100 of the angled protrusion 96 would bear against if a separation force were to be applied). Since the angled legs 82 are relatively stiff or rigid, the angled protrusions 96 would tend not to be able to be deflected and the strength of the snap-lock connection 70 would be retained up to the failure strength of the material used to form the packing elements 10, the post members 72 and the dome members 76.

The lattice packing element 10 may be formed using traditional injection molding techniques well known to those skilled in the art. As noted above, another advantage of the packing element 10 of the present invention is that the injection molding tool used to form the packing element 10 does not require moving parts. The undercut bottom edges 90 between the legs 82 of the cap 84 of the post member 72 forms a complex geometry for the post member and the packing element typically containing many post members. The undercut bottom edges 90 are designed to be formed by fixed mold protrusions that extend from the opposite side of an injection mold to the undercut bottom edges so that the injection molding operation can be performed more easily, including merely opening the mold to release the packing element including the post members with their complex undercut geometries. Mold cavity parts moving in the plane of the tool face are typically used to create complex geometries with undercut areas in general, where traditional cantilever undercut connections are present. Such moving parts are not necessary to mold the undercut bottom edges of the post member cap in the present invention. Therefore, the cost of the tool is reduced over a tool having moving or mechanical features that operate in a plane parallel to the tool face.

As mentioned in the Brief Summary of the Invention above, other aspects of the present invention include a contact assembly 12 formed from the packing elements 10 of the present invention and a method of making such a contact assembly 12. Now that almost all of the components of the packing element 10 have been described, the contact assembly 12 and methods of making it will now be described to the extent that they have not be described above.

Figure 7:
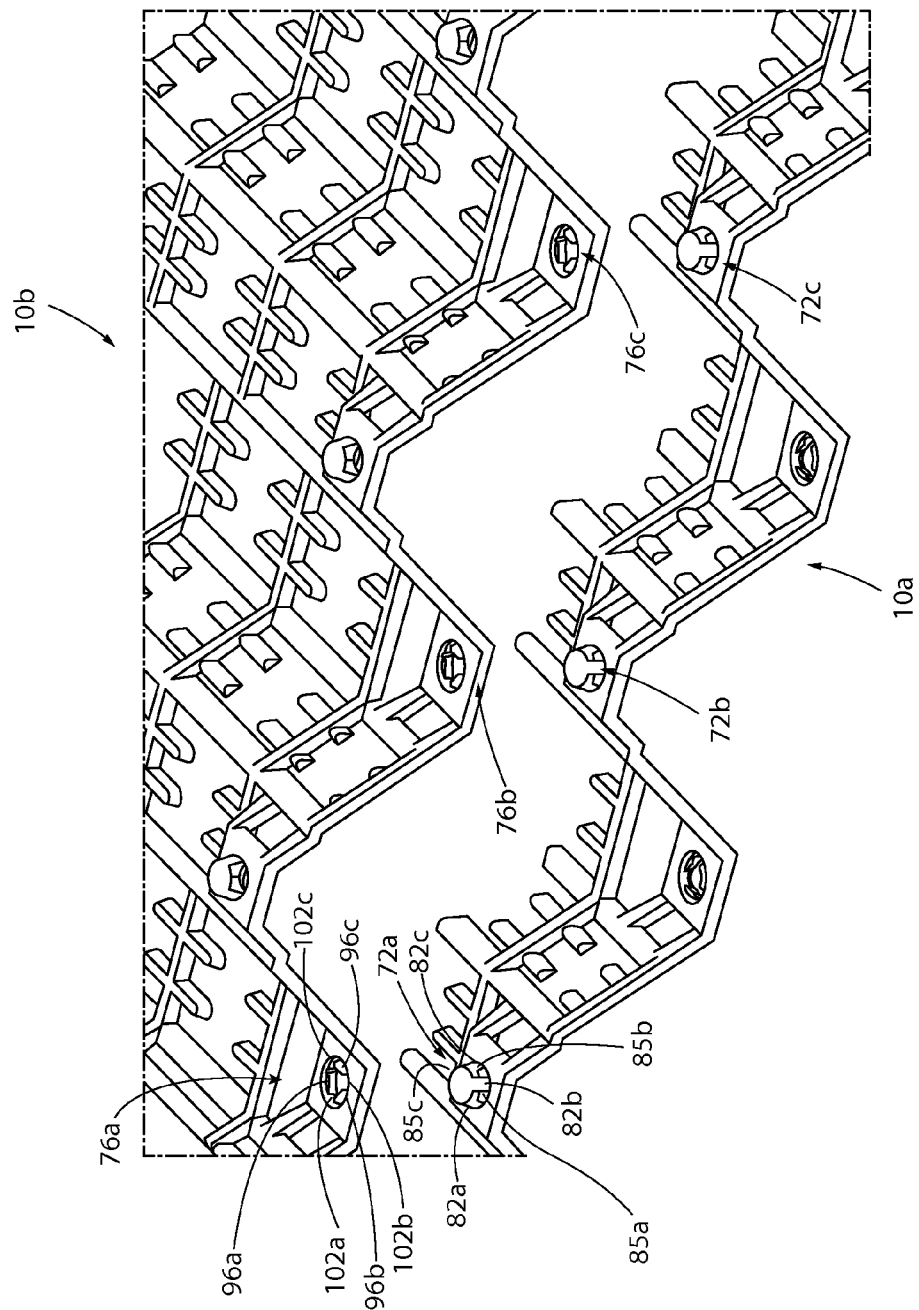
FIG. 7 is an exploded, isometric view of a portion of a contact assembly of the type shown in FIG. 2, but showing only two packing elements for the sake of clarity, including one corner of the contact assembly, that is enlarged to show the proper alignment of the packing elements after a rotation as mentioned above and described in more detail below, of one packing element 180° with respect to the other packing element just prior to the assembly of the packing elements together by which the post members and dome members are interconnected in a snap-lock manner.

One embodiment of a contact assembly 12 was briefly described above with reference to FIG. 2, showing an exemplary contact assembly made from a plurality of the exemplary packing elements 10 of FIG. 1. FIG. 7 is an exploded, isometric view of a portion of a contact assembly 12 of the type shown in FIG. 2, but showing only two packing elements 10a and 10b for the sake of clarity, including one corner of the contact assembly that is enlarged to show the proper alignment of the packing elements after a rotation of one packing element, say packing element 10b, 180° with respect to the other, adjacent packing element, say packing element 10a, around the axis z-z perpendicular to the major faces 14 and 16 of the packing elements (see FIG. 2), just prior to the assembly of the packing elements together. By making this 180° relative rotation of adjacent packing elements, the components of the post members 72 and dome members 76 are properly aligned and the properly aligned post members 72 and dome members 76 will be properly and securely interconnected in a snap-lock connection 70 (as shown in FIG. 5).

With reference to FIG. 7, three identical post members 72 are shown and identified as post members 72a, 72b and 72c. The components and orientation of the angled legs 82a, 82b and 82c and the spaces 85a, 85b and 85c respectively between the adjacent legs 82 of the post member 72 are shown in proper, aligned relationship with the corresponding spaces 102a, 102b and 102c between the respective adjacent angled protrusions 96a, 96b and 96c of the segmented truncated dome members 76. Thus, the leg 82a and the space 102a are aligned, the leg 82b and the space 102b are aligned and the leg 82c and the space 102c are aligned, as well as the protrusion 96a and the space 85a are aligned, the protrusion 96b and the space 85b are aligned and the protrusion 96c and the corresponding space 85c are aligned. When all of these components of the post member 72 and the dome member 76 are aligned after rotating one of the packing elements 10a or 10b 180° along axis z-z with respect to each other, a proper, strong snap-lock connection 70 as shown in FIGS. 5, 6 and 9 may be formed of any, and preferably at least a majority, and even all of the aligned post members 72a, 72b and 72c and dome members 76a, 76b and 76c shown in FIG. 7. Thus, the spaces between the angled protrusions are aligned with and sufficient to allow the legs to fit in the spaces between the protrusions only when one packing element is rotated 180° around an axis perpendicular to the major faces of the packing element with respect to the adjacent packing element to form a contact assembly from the packing elements.

To form the contact assembly 12, after the relative 180° rotation of adjacent packing elements has been accomplished, it is merely necessary to exert a relatively low force that can easily be applied by hand, without tools, to a first major face or faces 14 of one or more of such aligned packing element 10 in the vicinity of the aligned post members 72 and dome members 76, such that the top face 86 of the cap 84 of the post member 72 is inserted into and through the central opening 94 of the dome member until the undercut bottom edges 90 of the cap 84 extend just past the top edges 98 of the angled projections 96. The angled projections 96 will be pushed slightly outward radially from the central opening 94 by the top face 86 and the side edges 92 of the cap 84 until the undercut bottom edges 90 just clear the top edges 98 of the protrusions 96. At that point, the angled protrusions 96 return radially inward to their original position closer to the center of the central opening 94 to complete the formation of the snap-lock connection 70. As explained above, any force exerted in an attempt to separate the post members 72 from the dome members 76 of the snap-lock connections 70 of properly aligned adjacent packing elements 10 will be resisted to the point of dysfunction and even failure of the material of the post members, the dome members or the packing elements.

Figure 8:
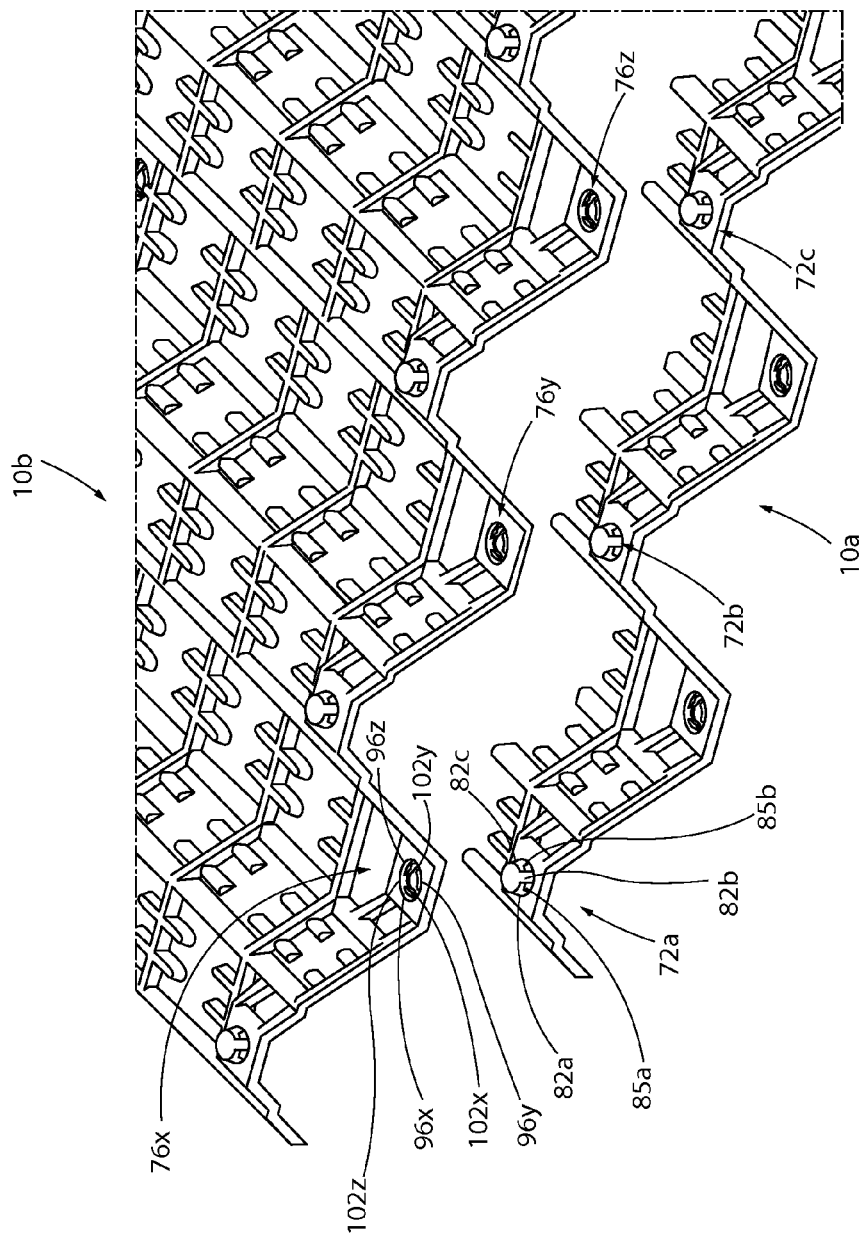
FIG. 8 is an exploded, isometric view of a portion of an attempted contact assembly of the type shown in FIG. 2, but showing only two packing elements for the sake of clarity, including one corner of the contact assembly, that is enlarged to show an improper alignment of the packing elements before the rotation of one packing element 180° with respect to the other packing element by which the post members and dome members cannot properly be interconnected in a snap-lock manner such that the packing elements cannot be properly assembled as a contact assembly.

As noted above, the legs 82 and spaces 85 of the post members 72 of one packing element 10 must be properly aligned with the respective spaces 102 and angled protrusions 96 of the segmented truncated dome members 76 of an adjacent packing element 10 to form a contact assembly 12 with secure snap-lock connections 70. Proper alignment of such components of the post members and dome members were just explained with reference primarily to FIG. 7. FIG. 8 is an exploded, isometric view of a portion of an attempted contact assembly of the type shown in FIG. 2, and similar to FIG. 7, showing only two packing elements for the sake of clarity, including one corner of the contact assembly, that is enlarged to show an improper alignment of the packing elements 10a and 10b before the rotation of one packing element, say packing element 10b, 180° with respect to the other packing element, say packing element 10a, by which the post members 72 and dome members 76 cannot properly be interconnected in a snap-lock manner to form a snap-lock connection 70. In the orientation of FIG. 8, the packing elements 10a and 10b cannot be properly assembled as a contact assembly 12.

More particularly, FIG. 8 shows how adjacent packing elements 10a and 10b are not capable of being assembled into a contact assembly such that the post members are retained in a snap-lock manner in the segmented truncated dome members without one packing element being rotated 180° around an axis z-z (see FIGS. 1 and 2) perpendicular to the major faces 14, 16, of the packing element 10b compared to the adjacent packing element 10a. Compared to FIG. 7, where the legs and spaces of the post members are properly aligned with the spaces and protrusions of the adjacent packing elements, FIG. 8 shows the incorrect or improper alignment of such components because the packing elements 10a and 10b have not been rotated 180° as explained above.

Prior to such rotation, the components of the post members and dome members do not fit together as follows, still with reference to FIG. 8. The components of the packing element 10a shown in FIG. 8 are identical to the components of packing element 10a in FIG. 7, since the packing element 10a would typically be the first, and usually a bottom packing element in an assembly of packing elements used to form a contact assembly 12. In FIG. 8, although the packing element 10b is identical to the packing element 10a of FIG. 8 and the packing element 10b of FIG. 7, without the previously described 180° rotation, the components of the post members 72a, 72b and 72c of packing element 10a are not aligned with the mating components of the dome members 76x, 76y and 76z to allow their interconnection in a snap-lock manner to form snap-lock connections 70 as shown in FIGS. 5, 6 and 9. In FIG. 8, the legs 82a, 82b and 82c of the post member 72a of the packing element 10a would butt against the respective aligned angled protrusions 96x, 96y and 96z of the dome member 76x of the packing element 10b. Likewise, the spaces 85a, 85b and 85c of the post member 72a of the packing element 10a would align with the respective spaces 102x, 102y and 102z of the dome member 76x of the packing element 10b. The same situation would apply to any attempted interconnection of the post members 72b and 72c of the packing element 10a with the dome members 76y and 76z of the packing element 10b. As explained above with reference to FIG. 7, the legs 82 and spaces 85 of a post member 72 on one packing element must be aligned with respective spaces 102 and protrusions 96 of an adjacent packing element, or vice versa, to form a snap-lock connection 70.

As mentioned in the Background of the Invention section above, the packing elements 10 of the present invention, which are connectable together into a contact assembly 12 in a snap-lock manner, have a significantly lower stacking height compared to packing elements of the same dimensions, other than the type of connectors, currently used for the prior art HTP-25™ splash fill media. This provides a considerable saving of storage space and shipping costs for the packing elements of the present invention. The differences are shown and explained better with reference to FIGS. 10 and 11 showing the relationship of stacked and nested packing elements of the prior art and the present invention, respectively, as they would be stacked for storage and shipment prior to being assembled into contact assemblies.

Figure 10:
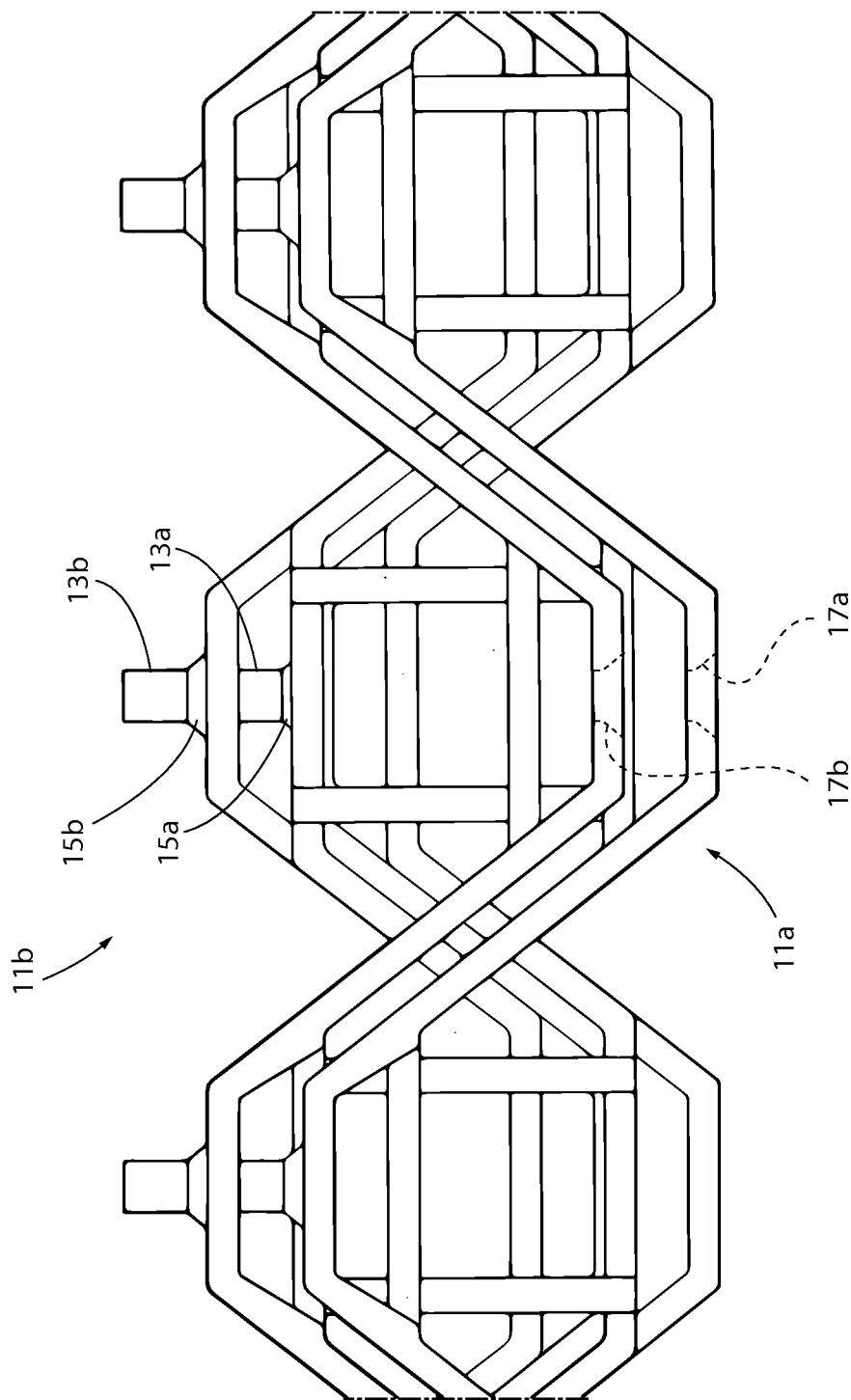
FIG. 10 is an enlarged side elevation view of a portion of two of Brentwood Industries, Inc.'s prior art packing elements used to make its HTP-25™ fill media nested for shipment prior to realignment and formation into a contact assembly, where the packing elements include the projections that are to be mechanically deformed to form the couplings in the form of flattened rivets.

FIG. 10 is an enlarged side elevation view of a portion of two of the prior art packing elements 11a and 11b used to make the prior art HTP-25™ fill media stacked and nested for shipment prior to realignment and formation into a contact assembly. The prior art packing elements 11a and 11b include the projections 13a and 13b, respectively, that are to be mechanically deformed after passing through the associated holes 17a and 17b to form the couplings in the form of flattened rivets. The holes 17a and 17b are shown schematically as formed in the packing elements 11a and 11b to receive the tops of the projections 13a and 13b, with the holes 17a and 17b having angled walls to receive and mate with the angled bottom portions 15a and 15b of the projections 13a and 13b in adjacent stacked packing elements. As mentioned above, the nesting height from the bottom of one lower packing element 11a to the bottom of the next adjacent upper packing element 11b is 0.227 inch (5.766 mm), resulting in a nesting height corresponding to 48 packing elements per foot (30.38 cm).

Figure 11:
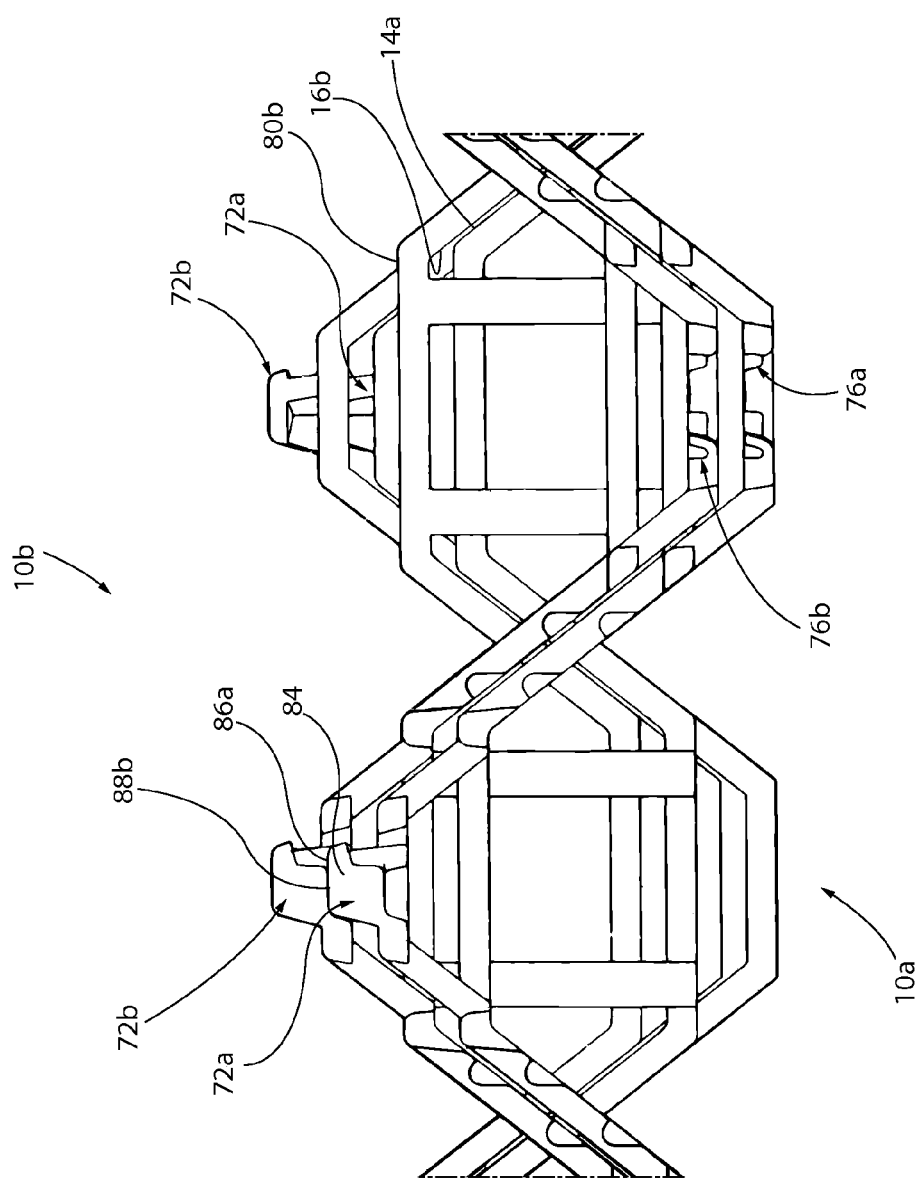
FIG. 11 is an enlarged side elevation view of portions of two packing elements according to one embodiment of the present invention along two adjacent corrugations, one portion in vertical cross-section, and one portion in side elevation, taken generally along the lines 11-11 of FIG. 3, nested for shipment showing a lower nesting height to show the nested height of the packing elements of the present invention compared to the nesting height of the prior art packing elements shown in FIG. 10.

FIG. 11 is an enlarged side elevation view of portions of two packing elements 10a and 10b of the embodiment described above regarding the present invention along two adjacent corrugations, one portion (the left in FIG. 11) in vertical cross-section, and one portion (the right in FIG. 11) in side elevation, taken generally along the lines 11-11 of FIG. 3 prior to the relative 180° rotation of one packing element with respect to the adjacent packing element as described above. Thus, FIG. 11 shows the packing elements 10a and 10b stacked and nested for storage and shipping purposes when the first major face 14a of one packing element 10a is next to the second major face 16b of an adjacent packing element 10b prior to being rotated. The post members 72a and 72b are aligned with each other and the dome members 76a and 76b are aligned with each other in adjacent packing elements 10a and 10b. The top face 86a of the post member 72a of the packing element 10a fits in between the legs of the post member 72b of the packing element 10b and extends until it abuts the lower surface 88 of the post member 72b of the packing element 10b.

The nesting height from the bottom of one lower packing element 10a to the bottom of the next adjacent upper packing element 10b using the packing elements of the present invention where the angled protrusions 96 forming the segmented truncated dome members 76 have an angle of about 70° to about 75° with respect to the second face 83 of the shorter surface portion 79 of the generally trapezoidal prismatic valley extension 78, is 0.140 inch (3.556 mm). This is about a 38% reduction in nesting height compared to the nesting height of the prior art packing elements 11 used for the prior art HTP-25™ splash fill media. The nesting height for such packing elements 10 of the present invention for storage and shipment thus corresponds to 78 packing elements per foot (30.38 cm), which is 30 more packing elements 10 per foot (30.38 cm) than the prior art packing elements [is this accurate for a dome angle of 70°-75°?]. Multiplying the volume savings for pallet-load or truck loads by using the packing elements of the present invention compared to the prior art makes it very readily apparent that there is a considerable saving of storage space and shipping costs for the packing elements of the present invention.

A method of making the contact assembly 12 of the present invention was discussed above, comprising a plurality of packing elements 10 as just described. In general, the method comprises providing a plurality of the packing elements 10; aligning the packing elements such that adjacent packing elements are rotated 180° around an axis z-z perpendicular to the first and second major faces 14 and 16 with respect to the adjacent packing elements; and inserting at least some of the post members 72 of one packing element into aligned dome members 76 of the adjacent packing element, whereby the post members inserted into aligned dome members are retained together in a snap-lock manner forming snap-lock connections 70, and thereby forming the contact assembly 12.

There are various ways that this method can be performed. One way is to align the first and second side edge 36 and 40 and the first and second end edges 44 and 48 of one packing element 10, such as a packing element 10a with the corresponding respective second and first side edges 40 and 36 and the corresponding respective second and first end edges 48 and 44 of an adjacent, rotated second packing element 10, such as a packing element 10b, as shown in FIG. 7, and relatively easily snapping the post members 72, such as 72a, 72b and 72c, for example, of the packing element 10a into the properly aligned segmented truncated dome member 76, such as 76a, 76b and 76c of the packing element 10b. This can be readily and easily accomplished by hand, simply by pressing the packing element 10b against the packing element 10a at least in the vicinity of the aligned post members 72 and dome members 76. This action is then repeated for every adjacent packing element 10c up to packing element 10n after each packing element is rotated with respect to the adjacent packing element as described above. When all of the respective side and end edges are aligned and all of the post members and dome members are interconnected to form snap-lock connections 70, a contact assembly 12 results, as shown in FIG. 2.

Another way of making a contact assembly 12 is to stack more than one packing element 10, each properly aligned after rotation as described above, on top of each other, with at least some of the post members 72 properly aligned with the dome members 76, and then pushing on the top packing element of the stack to interconnect all the aligned post members 72 and dome members 76 to form a plurality of snap-lock connections 70 substantially simultaneously through the entire stack of packing elements. The snap-lock connections 70 could also be formed serially from one end or side of the stack toward the opposite side of end of the stack of packing elements.

It is not necessary that side and end edges of a plurality of packing elements 10 be aligned with each other to make a contact assembly 12. Another technique that could readily be used, especially for making contact assemblies longer than the length of any given packing element or wider than any given packing element or both longer and wider than any given packing element, would be to align some, preferably a majority, and more preferably, as many as possible, of properly aligned post members 72 and dome members 76 of adjacent packing elements 10, where the appropriate side edges, end edges or both side and end edges extend past each other on adjacent, properly rotated packing elements. The aligned post members and dome members would then be pressed together, either one by one or as a stack of more than two packing elements 10, to form the snap-lock connections 70. When a desired number of packing elements 10 has been arranged in this manner, the ends, sides or both ends and sides of the stacked packing elements 10 could be trimmed to form a contact assembly 12 of desired length and width, such that a suitable number of snap-lock connections 70, in any necessary amount, depending on the intended use of the contact assembly, are present within the contact assembly to retain the packing elements together as an integral contact assembly 12.

If desired, instead of making the contact assemblies 12 entirely by hand, simple tools, preferably easily used by hand, could be used to enhance the efficiency of the assembly, such as a board to press on the top of two or more properly aligned packing elements, or a roller, with or without compression teeth aligned with the post members and dome members, which could easily be held in a hand, to roll along the top of two or more properly aligned packing elements. The rollers could have the basic structure such as those shown and described in any of Brentwood Industries, Inc.'s U.S. Pat. Nos. 6,544,628, 6,640,427, and 6,877,205, the disclosures of all of which are hereby incorporated by reference herein in their entireties.

Figure 12:
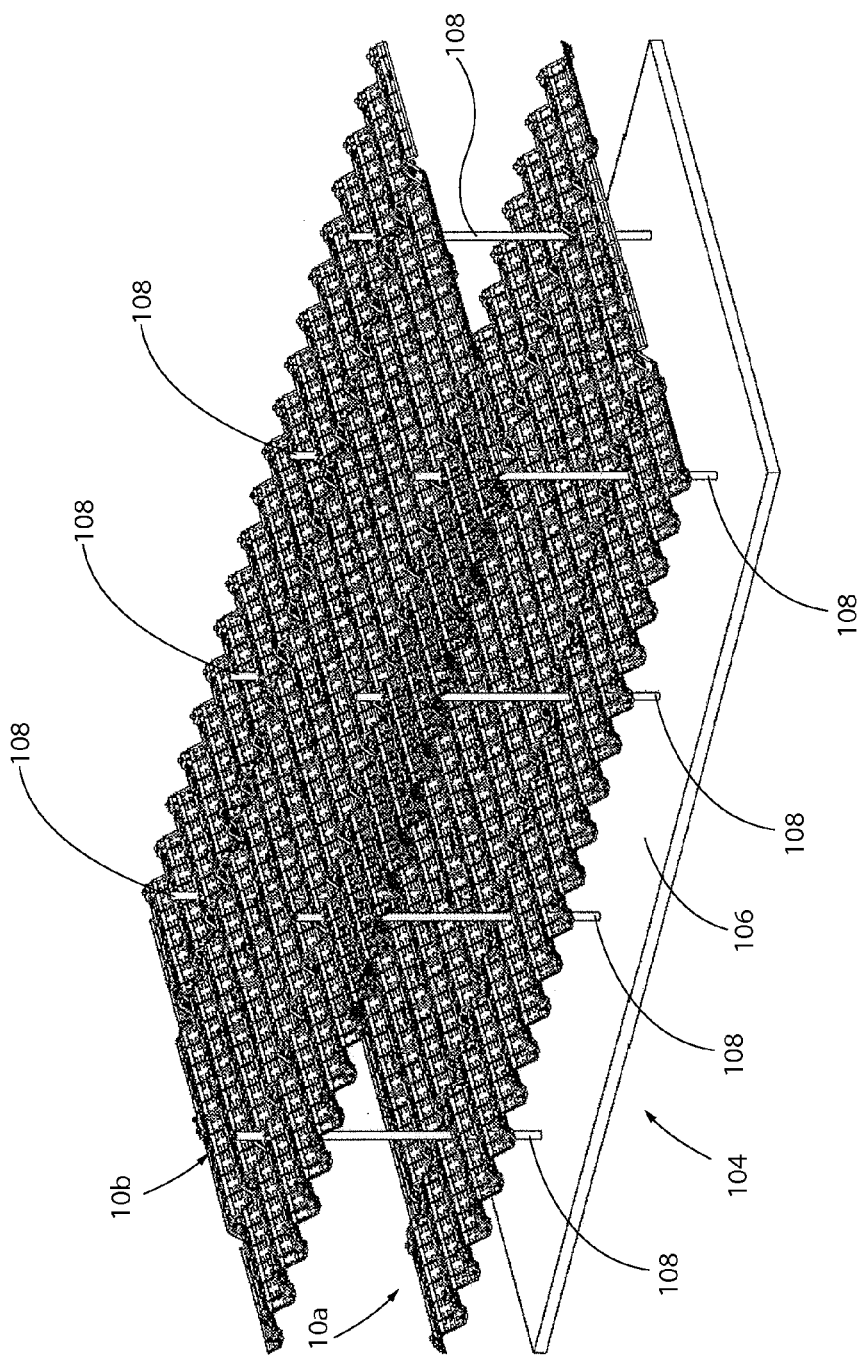
FIG. 12 is an isometric view of one embodiment of an exemplary fixture that could be used to efficiently assemble together packing elements of the present invention, two of which are shown for clarity of explanation, to form an embodiment of a contact assembly of the present invention.

It likely would be more efficient to make the contact assembly 12 using a simple fixture that could readily align rotated packing elements. An example of one embodiment of such a fixture 104 is shown in FIG. 12, where only two packing elements 10a and 10b of the type illustrated in FIG.

7 are shown for clarity of explanation. For use in such a fixture 104, the packing elements 10 of the present invention preferably have a plurality of alignment holes 105, as shown in FIG. 3. The alignment holes 105 are located in the packing elements 10 in locations that correspond to the alignment holes 105 on adjacent packing elements being aligned with each other after adjacent packing elements have been rotated 180° as described above for alignment as described with respect to FIG. 7.

The fixture 104 may simply comprise a base 106 and a plurality of alignment rods 108 that may be screwed into the base 106 or adhesively attached within mating holes in the base 106. The alignment rods 108 are located to register with the alignment holes 105 of any desired number of stacked packing elements 10 that fit in the fixture 104 to be formed into the contact assembly 12. For aligning packing elements 10 having an exemplary preferred dimension of about two feet (about 61 cm) from the first side edge 36 to the second side edge 40 by about four feet (about 122 cm) from the first end edge 44 to the second end edge 48, a fixture having eight alignment rods 108 is preferred, although any other number of alignment rods may be used as desired.

When using a packing element alignment fixture, such as the fixture 104, to make a contact assembly 12, one method comprises aligning a first packing element 10a in the fixture 104 by inserting the packing element 10a into the fixture so that the alignment holes 105 register with the alignment rods 108 and the alignment rods pass through the alignment holes 105; rotating a second packing element 10b 180° with respect to the first packing element 10a around an axis z-z perpendicular to the first and second major faces 14 and 16 of the packing elements 10a or 10b; inserting the rotated second packing element 10b into the fixture 104 so that at least some of the alignment holes 105 of the second packing element 10b register with the alignment rods 108 and the alignment rods pass through the alignment holes such that at least some of the post members 72 of the first packing element 10a are aligned with dome members 76 of the second packing element 10b and at least some of the dome members 76 of the first packing element 10a are aligned with post members 72 of the second packing element 10b; and repeating the foregoing rotation and alignment of the subsequent packing elements 10 in the fixture 104 with the alignment holes 105 registered with the alignment rods until a sufficient number of packing elements are used to make the contact assembly 12.

When using the fixture 104, the method further comprises pressing on the second packing element 10b to cause the post members 72 and the dome members 76 of the first packing element to form a snap-lock connection 70 with respective aligned dome members 76 and post members 72 of the second packing element 10b and pressing on each subsequently rotated and aligned packing element 10 in to cause the post members 72 and the dome members 76 of the next successive packing element 10 to form a snap-lock connection 70 with respective aligned dome members 76 and post members 72 of the previously placed packing element, to thereby make the contact assembly 12. Once the snap-lock connections 70 have been formed, the contact assembly 12 is removed from the fixture 104.

Alternatively when a fixture like fixture 104 is being used, instead of pressing each subsequent rotated and aligned packing element 10 individually to make the snap-lock connections 70, a plurality of rotated and aligned packing elements 10 can be pressed together, such as by pressing on the top such packing element 10, to cause the post members 72 and the dome members 76 of the plurality of aligned packing elements 10 to form snap-lock connections with respective aligned dome members 76 and post members 72 of all of the aligned packing elements 10 to thereby make the contact assembly 12. When the snap-lock connections 70 have been formed, the contact assembly 12 may be removed from the fixture 104.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A packing element for a contact assembly made from a plurality of packing elements, each packing element comprising:

a lattice packing element of material having a first major face and an opposed second major face, a first side with a first side edge and an opposed second side with a second side edge, a first end with a first end edge and an opposed second end with a second end edge;

a plurality of corrugations, each having a length formed in the major faces extending at least partially from the first side toward the second side, each corrugation having a peak and a valley joined by angled side walls, the peak having a first peak face corresponding to the first major face and a second peak face opposed to the first peak face and corresponding to the second major face, the valley having a first valley face corresponding to the first major face and a second valley face opposed to the first valley face and corresponding to the second major face;

at least some of the peaks having at least one post member formed on and extending from the first peak face in a direction away from the first major face and at least some of the valleys having at least one segmented truncated dome member formed on and extending from the second valley face toward the first valley face, the post member of a peak being alignable with the segmented truncated dome member of an adjacent valley in an adjacent packing element when one packing element is rotated 180° around an axis perpendicular to the major faces of the packing element compared to the adjacent packing element to form a contact assembly from the packing elements;

the post member comprising a plurality of angled legs spaced from each other extending from the first peak face to a cap, the cap having a top face, side edges and undercut bottom edges between the legs;

the segmented truncated dome member having a central opening surrounded by a plurality of spaced dome segments formed by angled protrusions extending from the second valley face toward the first valley face, each of the angled protrusions of the segmented truncated dome member having a top edge, the plurality of the dome segments being equal to a number of spaces between the angled legs of the post member, the angled protrusions of the segmented truncated dome member having locations corresponding to locations of the spaces between the legs of the post member;

the legs of the post member having a length sufficient for the post member and its cap to extend through the central opening of the segmented truncated dome member of an adjacent packing element when appropriately aligned therewith to such an extent that the undercut bottom edges of the cap may bear against the top edges of the angled protrusions of an aligned segmented truncated dome member of an adjacent packing element in a snap-lock manner to retain the adjacent packing elements together as a contact assembly such that a force needed to separate a post member inserted into a segmented truncated dome member in the snap-lock manner is so great that the material forming at least one of the post member, the segmented truncated dome member or the packing element will fail to the extent that a contact assembly made using the packing elements would not be functional.

2. The packing element of claim 1, wherein the post member is formed on and extends from a generally trapezoidal prismatic peak extension extending from the first peak face, the generally trapezoidal prismatic peak extension having a shorter surface portion with a first peak face corresponding to the first major face of the packing element and an opposed second peak face corresponding to the second major face of the packing element and the segmented truncated dome member is formed on and extends from a generally trapezoidal prismatic valley extension extending from the second valley face, the segmented truncated dome member extending toward the first valley face, the generally trapezoidal prismatic valley extension having a shorter surface portion with a first face corresponding to the first major face of the packing element and a second face corresponding to the second major face of the packing element.

3. The packing element of claim 1, wherein at least some of the peaks have at least two post members separated along the length of the corrugation extending from the first peak face and at least some of the valleys have at least two segmented truncated dome members separated along the length of the corrugation extending from the second valley face.

4. The packing element of claim 3, wherein two post members are formed on and extend from every peak, one adjacent the first side edge and another adjacent the second side edge and from the first end to the second end of the packing element, and two segmented truncated dome members are formed on and extend from every valley, one adjacent the first side edge and another adjacent the second side edge and from the first end to the second end of the packing element.

5. The packing element of claim 4, wherein at least one additional post member is formed on and extends from every peak at least in one location along the length of the corrugations between the post members adjacent the side edges and wherein at least one additional segmented truncated dome member is formed on and extends from every valley at least in one location along the length of the corrugations between the segmented truncated dome members adjacent the side edges.

6. The packing element of claim 2, wherein at least one post member is formed on and extends from a respective generally trapezoidal prismatic peak extension on every peak along the length of the corrugations and wherein at least one segmented truncated dome member is formed on and extends from the second valley face toward the first valley face of respective generally trapezoidal prismatic valley extensions on every valley along the length of the corrugations.

7. The packing element of claim 2, wherein the segmented truncated dome member is recessed within the shorter surface portion of the generally trapezoidal prismatic valley extension.

8. The packing element of claim 2, wherein the generally trapezoidal prismatic peak extension is offset from the first peak face.

9. The packing element of claim 1, wherein adjacent packing elements are not capable of being assembled into a contact assembly such that the post members are retained in a snap-lock manner in the segmented truncated dome members without one packing element being rotated 180° around an axis perpendicular to the major faces of the packing element compared to the adjacent packing element, but adjacent packing elements are nestable when the first major face of one packing element is next to the second major face of an adjacent packing element prior to being rotated and when the post members are aligned with each other in adjacent packing elements.

10. The packing element of claim 1, wherein the post member has three legs spaced at locations spaced 120° around the cap, and the segmented truncated dome member has three spaced dome segments formed by the angled protrusions at locations spaced 120° around the central opening, and wherein spaces between the angled protrusions are aligned with and sufficient to allow the legs to fit in the spaces between the angled protrusions only when one packing element is rotated 180° around an axis perpendicular to the major faces of the packing element with respect to the adjacent packing element to form a contact assembly from the packing elements.

11. The packing element of claim 1, wherein the angled protrusions of the segmented truncated dome member are angled about 30° to about 80° with respect to a plane corresponding to the second valley face with the top edges of the angled protrusions being angled substantially perpendicular to the angle of the angled protrusions.

12. The packing element of claim 1, wherein the undercut bottom edges of the cap of the post member are angled with respect to the cap side edges so as to bear against the top edges of the spaced dome segments angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions result, to cause the angled protrusions to tend to move toward and against the legs of the post member.

13. The packing element of claim 2, wherein the post member has three legs spaced at locations spaced 120° around the cap, and the segmented truncated dome member has three spaced dome segments formed from the angled protrusions at locations spaced 120° around the central opening, and wherein the spacing between the angled protrusions is aligned with and sufficient to allow the legs to fit in the spaces between the angled protrusions only when one packing element is rotated 180° around an axis perpendicular to the major faces of the packing element compared to the adjacent packing element to form a contact assembly from the packing elements, wherein the angled protrusions of the segmented truncated dome member are angled about 50° to about 75° with respect to a plane corresponding to the second face of the shorter surface portion of the generally trapezoidal prismatic valley extension with the top edges of the angled protrusions angled substantially perpendicular to the angle of the angled protrusions, and wherein the undercut bottom edges of the cap of the post member are angled with respect to the cap side edges so as to bear against the top edges of the angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions results, to cause the angled protrusions to tend to move toward and against the legs of the post member.

14. A contact assembly made from a plurality of packing elements, each packing element comprising a plurality of packing elements;

each packing element comprising:

a lattice packing element of material having a first major face and an opposed major face, a first side with a first side edge and an opposed second side with a second side edge, a first end with a first end edge and an opposed second end with a second end edge;

a plurality of corrugations, each having a length formed in the major faces extending at least partially from the first side toward the second side, each corrugation having a peak and a valley joined by angled side walls, the peak having a first peak face corresponding to the first major face and a second peak face opposed to the first peak face and corresponding to the second major face, the valley having a first valley face corresponding to the first major face and a second valley face opposed to the first valley face and corresponding to the second major face;

at least some of the peaks having at least one post member formed on and extending from the first peak face in a direction away from the first major face and at least some of the valleys having at least one segmented truncated dome member formed on and extending from the second valley face toward the first valley face, the post member of a peak being alignable with the segmented truncated dome member of an adjacent valley in an adjacent packing element when one packing element is rotated 180° around an axis perpendicular to the major faces of the packing element compared to the adjacent packing element to form a contact assembly from the packing elements;

the post member comprising a plurality of angled legs spaced from each other extending from the first peak face to a cap, the cap having a top face, side edges and undercut bottom edges between the legs;

the segmented truncated dome member having a central opening surrounded by a plurality of spaced dome segments formed by angled protrusions extending from the second valley face toward the first valley face, each of the angled protrusions of the segmented truncated dome member having a top edge, the plurality of the dome segments being equal to a number of spaces between the angled legs of the post member, the angled protrusions of the segmented truncated dome member having locations corresponding to locations of the spaces between the legs of the post member;

the legs of the post member having a length sufficient for the post member and its cap to extend through the central opening of the segmented truncated dome member of an adjacent packing element when appropriately aligned therewith to such an extent that the undercut bottom edges of the cap may bear against the top edges of the angled protrusions of an aligned segmented truncated dome member of an adjacent packing element in a snap-lock manner to retain the adjacent packing elements together as a contact assembly such that a force needed to separate a post member inserted into a segmented truncated dome member in the snap-lock manner is so great that the material forming at least one of the post member, the segmented truncated dome member or the packing element will fail to the extent that a contact assembly made using the packing elements would not be functional;

wherein each packing element is aligned with an adjacent packing element by being rotated 180° around an axis perpendicular to the major faces of the packing element compared to the adjacent packing element, the adjacent packing elements being attached to each other when at least some of the post members of one packing element are inserted into aligned dome members of the adjacent packing element and retained together in a snap-lock manner to form the contact assembly.

15. The contact assembly of claim 14, wherein the post member is formed on and extends from a generally trapezoidal prismatic peak extension extending from the first peak face, the generally trapezoidal prismatic peak extension having a shorter surface portion with a first peak face corresponding to the first major face of the packing element and an opposed second peak face corresponding to the second major face of the packing element and the segmented truncated dome member is formed on and extends from a generally trapezoidal prismatic valley extension extending from the second valley face, the segmented truncated dome member extending toward the first valley face, the generally trapezoidal prismatic valley extension having a shorter surface portion with a first face corresponding to the first major face of the packing element and a second face corresponding to the second major face of the packing element.

16. The contact assembly of claim 14, wherein at least some of the peaks have at least two post members separated along the length of the corrugation extending from the first peak face and at least some of the valleys have at least two segmented truncated dome members separated along the length of the corrugation extending from the second valley face, the adjacent packing elements being attached to each other when at least some of the post members of one packing element are inserted into aligned respective segmented truncated dome members of the adjacent packing element and retained together in a snap-lock manner.

17. The contact assembly of claim 16, wherein two post members are formed on and extend from every peak, one adjacent the first side edge and another adjacent the second side edge and from the first end to the second end of the packing element, and two segmented truncated dome members are formed on and extend from every valley, one adjacent the first side edge and another adjacent the second side edge and from the first end to the second end of the packing element, the adjacent packing elements being attached to each other when at least some of the post members of one packing element are inserted into aligned respective segmented truncated dome members of the adjacent packing element and retained together in a snap-lock manner.

18. The contact assembly of claim 17, wherein at least one additional post member is formed on and extends from every peak at least in one location along the length of the corrugations between the post members adjacent the side edges and wherein at least one additional segmented truncated dome member is formed on and extends from every valley at least in one location along the length of the corrugations between the segmented truncated dome members adjacent the side edges, the adjacent packing elements being attached to each other when at least some of the post members of one packing element are inserted into aligned respective segmented truncated dome members of the adjacent packing element and retained together in a snap-lock manner.

19. The contact assembly of claim 15, wherein at least one post member is formed on and extends from a respective generally trapezoidal prismatic peak extension on every peak along the length of the corrugations and wherein at least one segmented truncated dome member is formed on and extends from the second valley face toward the first valley face of respective generally trapezoidal prismatic valley extensions on every valley along the length of the corrugations, the adjacent packing elements being attached to each other when at least some of the post members of one packing element are inserted into aligned respective segmented truncated dome members of the adjacent packing element and retained together in a snap-lock manner.

20. The contact assembly of claim 15, wherein the segmented truncated dome member is recessed within the shorter surface portion of the generally trapezoidal prismatic valley extension.

21. The contact assembly of claim 15, wherein the generally trapezoidal prismatic peak extension is offset from the first peak face.

22. The contact assembly of claim 14, wherein adjacent packing elements are not capable of being assembled into a contact assembly such that the post members are retained in a snap-lock manner in the segmented truncated dome members without one packing element being rotated 180° around an axis perpendicular to the major faces of the packing element compared to the adjacent packing element, but adjacent packing elements are nestable when the first major face of one packing element is next to the second major face of an adjacent packing element prior to being rotated and when the post members are aligned with each other in adjacent packing elements.

23. The contact assembly of claim 14, wherein the post member has three legs spaced at locations spaced 120° around the cap, and the segmented truncated dome member has three spaced dome segments formed by the angled protrusions at locations spaced 120° around the central opening, and wherein spaces between the angled protrusions are aligned with and sufficient to allow the legs to fit in the spaces between the angled protrusions only when one packing element is rotated 180° around an axis perpendicular to the major faces of the packing element with respect to the adjacent packing element to form a contact assembly from the packing elements.

24. The contact assembly of claim 14, wherein the angled protrusions of the segmented truncated dome member are angled about 30° to about 80° with respect to a plane corresponding to the second valley face with the top edges of the angled protrusions being angled substantially perpendicular to the angle of the angled protrusions.

25. The contact assembly of claim 14, wherein the undercut bottom edges of the cap of the post member are angled with respect to the cap side edges so as to bear against the top edges of the spaced dome segments angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions result, to cause the angled protrusions to tend to move toward and against the legs of the post member.

26. The contact assembly of claim 14, wherein the post member has three legs spaced at locations spaced 120° around the cap, and the segmented truncated dome member has three spaced dome segments formed from the angled protrusions at locations spaced 120° around the central opening, and wherein the spacing between the angled protrusions is aligned with and sufficient to allow the legs to fit in the spaces between the angled protrusions only when one packing element is rotated 180° around an axis perpendicular to the major faces of the packing element compared to the adjacent packing element to form a contact assembly from the packing elements, wherein the angled protrusions of the segmented truncated dome member are angled about 50° to about 75° with respect to a plane corresponding to the second face of the shorter surface portion of the generally trapezoidal prismatic valley extension with the top edges of the angled protrusions angled substantially perpendicular to the angle of the angled protrusions, and wherein the undercut bottom edges of the cap of the post member are angled with respect to the cap side edges so as to bear against the top edges of the angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions results, to cause the angled protrusions to tend to move toward and against the legs of the post member.

27. A method of making a contact assembly comprising a plurality of packing elements, the method comprising:
(a) providing a plurality of packing elements, each packing element comprising:
a lattice packing element of material having a first major face and an opposed major face, a first side with a first side edge and an opposed second side with a second side edge, a first end with a first end edge and an opposed second end with a second end edge;
a plurality of corrugations, each having a length formed in the major faces extending at least partially from the first side toward the second side, each corrugation having a peak and a valley joined by angled side walls, the peak having a first peak face corresponding to the first major face and a second peak face opposed to the first peak face and corresponding to the second major face, the valley having a first valley face corresponding to the first major face and a second valley face opposed to the first valley face and corresponding to the second major face;
at least some of the peaks having at least one post member formed on and extending from the first peak face in a direction away from the first major face and at least some of the valleys having at least one segmented truncated dome member formed on and extending from the second valley face toward the first valley face, the post member of a peak being alignable with the segmented truncated dome member of an adjacent valley in an adjacent packing element when one packing element is rotated 180° around an axis perpendicular to the major faces of the packing element compared to the adjacent packing element to form a contact assembly from the packing elements;

the post member comprising a plurality of angled legs spaced from each other extending from the first peak face to a cap, the cap having a top face, side edges and undercut bottom edges between the legs;

the segmented truncated dome member having a central opening surrounded by a plurality of spaced dome segments formed by angled protrusions extending from the second valley face toward the first valley face, each of the angled protrusions of the segmented truncated dome member having a top edge, the plurality of the dome segments being equal to a number of spaces between the angled legs of the post member, the angled protrusions of the segmented truncated dome member having locations corresponding to locations of the spaces between the legs of the post member;

the legs of the post member having a length sufficient for the post member and its cap to extend through the central opening of the segmented truncated dome member of an adjacent packing element when appropriately aligned therewith to such an extent that the undercut bottom edges of the cap may bear against the top edges of the angled protrusions of an aligned segmented truncated dome member of an adjacent packing element in a snap-lock manner to retain the adjacent packing elements together as a contact assembly such that a force needed to separate a post member inserted into a segmented truncated dome member in the snap-lock manner is so great that the material forming at least one of the post member, the segmented truncated dome member or the packing element will fail to the extent that a contact assembly made using the packing elements would not be functional;

the method further comprising:

(b) aligning the packing elements such that adjacent packing elements are rotated 180° around an axis perpendicular to the major faces with respect to the adjacent packing elements; and (c) inserting at least some of the post members of one packing element into aligned dome members of the adjacent packing element whereby the post members inserted into aligned dome members are retained together in a snap-lock manner, thereby forming the contact assembly.

28. The method of claim 27, wherein the post member is formed on and extends from a generally trapezoidal prismatic peak extension extending from the first peak face, the generally trapezoidal prismatic peak extension having a shorter surface portion with a first peak face corresponding to the first major face of the packing element and an opposed second peak face corresponding to the second major face of the packing element and the segmented truncated dome member is formed on and extends from a generally trapezoidal prismatic valley extension extending from the second valley face, the segmented truncated dome member extending toward the first valley face, the generally trapezoidal prismatic valley extension having a shorter surface portion with a first face corresponding to the first major face of the packing element and a second face corresponding to the second major face of the packing element.

29. The method of claim 27, wherein at least some of the peaks have at least two post members separated along the length of the corrugation extending from the first peak face and at least some of the valleys have at least two segmented truncated dome members separated along the length of the corrugation extending from the second valley face; the method further comprising inserting at least some of the post members of one packing element into respective aligned segmented truncated dome members of the adjacent packing element whereby the post members inserted into the respective aligned segmented truncated dome members are retained together in a snap-lock manner, thereby forming the contact assembly.

30. The method of claim 27, wherein two post members are formed on and extend from every peak, one adjacent the first side edge and another adjacent the second side edge and from the first end to the second end of the packing element, and two segmented truncated dome members are formed on and extend from every valley, one adjacent the first side edge and another adjacent the second side edge and from the first end to the second end of the packing element; the method further comprising inserting at least some of the post members of one packing element into respective aligned segmented truncated dome members of the adjacent packing element whereby the post members inserted into the respective aligned segmented truncated dome members are retained together in a snap-lock manner, thereby forming the contact assembly.

31. The method of claim 30, wherein at least one additional post member is formed on and extends from every peak at least in one location along the length of the corrugations between the post members adjacent the side edges and wherein at least one additional segmented truncated dome member is formed on and extends from every valley at least in one location along the length of the corrugations between the segmented truncated dome members adjacent the side edges, the adjacent packing elements being attached to each other when the all of the post members of one packing element are inserted into the aligned respective segmented truncated dome members of the adjacent packing element and retained together in a snap-lock manner.

32. The method of claim 27, wherein at least one post member is formed on and extends from a respective generally trapezoidal prismatic peak extension on every peak along the length of the corrugations and wherein at least one segmented truncated dome member is formed on and extends from the second valley face toward the first valley face of respective generally trapezoidal prismatic valley extensions on every valley along the length of the corrugations; the method further comprising inserting at least some of the post members of one packing element into respective aligned dome members of the adjacent packing element whereby the post members inserted into the respective aligned segmented truncated dome members are retained together in a snap-lock manner, thereby forming the contact assembly.

33. The method of claim 28, wherein the segmented truncated dome member is recessed within the shorter surface portion of the generally trapezoidal prismatic valley extension.

34. The method of claim 28, wherein the generally trapezoidal prismatic peak extension is offset from the first peak face.

35. The method of claim 27, wherein adjacent packing elements are not capable of being assembled into a contact assembly such that the post members are retained in a snap-lock manner in the segmented truncated dome members without one packing element being rotated 180° around an axis perpendicular to the major faces of the packing element compared to the adjacent packing element, but adjacent packing elements are nestable when the first major face of one packing element is next to the second major face of an adjacent packing element prior to being rotated and when the post members are aligned with each other in adjacent packing elements.

36. The method of claim 27, wherein the post member has three legs spaced at locations spaced 120° around the cap, and the segmented truncated dome member has three spaced dome segments formed by the angled protrusions at locations spaced 120° around the central opening, and wherein spaces between the angled protrusions are aligned with and sufficient to allow the legs to fit in the spaces between the angled protrusions only when one packing element is rotated 180° around an axis perpendicular to the major faces of the packing element with respect to the adjacent packing element to form a contact assembly from the packing elements.

37. The method of claim 27, wherein the angled protrusions of the segmented truncated dome member are angled about 30° to about 80° with respect to a plane corresponding to the second valley face with the top edges of the angled protrusions being angled substantially perpendicular to the angle of the angled protrusions.

38. The method of claim 27, wherein the undercut bottom edges of the cap of the post member are angled with respect to the cap side edges so as to bear against the top edges of the spaced dome segments angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions result, to cause the angled protrusions to tend to move toward and against the legs of the post member.

39. The method of claim 28, wherein the post member has three legs spaced at locations spaced 120° around the cap, and the segmented truncated dome member has three spaced dome segments formed from the angled protrusions at locations spaced 120° around the central opening, and wherein the spacing between the angled protrusions is aligned with and sufficient to allow the legs to fit in the spaces between the angled protrusions only when one packing element is rotated 180° around an axis perpendicular to the major faces of the packing element compared to the adjacent packing element to form a contact assembly from the packing elements, wherein the angled protrusions of the segmented truncated dome member are angled about 50° to about 75° with respect to a plane corresponding to the second face of the shorter surface portion of the generally trapezoidal prismatic valley extension with the top edges of the angled protrusions angled substantially perpendicular to the angle of the angled protrusions, and wherein the undercut bottom edges of the cap of the post member are angled with respect to the cap side edges so as to bear against the top edges of the angled protrusions and the undercut bottom edges of the cap are angled to be to substantially perpendicular or slightly less than substantially perpendicular to the angle of the angled protrusions so that any force exerted by the undercut bottom edges of the cap of the post member to separate the post member when retained in the segmented truncated dome member in a snap-lock manner will either be directed through the angled protrusions along at the angle of the angled protrusions or if any deflection of the angled protrusions results, to cause the angled protrusions to tend to move toward and against the legs of the post member.

40. The method of claim 27, wherein the packing element further comprises a plurality of alignment holes extending between the first face and the second face, the method further comprising:
(d) aligning a first packing element in a fixture comprising a plurality of alignment rods by inserting the packing element into the fixture so that the alignment holes register with the alignment rods and the alignment rods pass through the alignment holes;
(e) rotating a second packing element 180° with respect to the first packing element around an axis perpendicular to the major faces;
(f) inserting the rotated second packing element into the fixture so that at least some of the alignment holes of the second packing element register with the alignment rods and the alignment rods pass through the alignment holes such that at least some of the post members of the first packing element are aligned with dome members of the second packing element and at least some of the dome members of the first packing element are aligned with post members of the second packing element; and
(g) repeating (e) and (f) with subsequent packing elements until a sufficient number of packing elements are used to make the contact assembly.

41. The method of claim 40, the method further comprising:
(f)(1) pressing on the second packing element to cause the post members and the dome members of the first packing element to form a snap-lock connection with respective aligned dome members and post members of the second packing element; and
(g)(1) pressing on each subsequently aligned packing element in (g) to cause the post members and the dome members of the next successive packing element to form a snap-lock connection with respective aligned dome members and post members of the previously placed packing element to thereby make the contact assembly.

42. The method of claim 38, the method further comprising:
(h)(1) removing the contact assembly from the fixture.

43. The method of claim 40, the method further comprising:
(g)(2) pressing on a plurality of aligned packing element in (g) to cause the post members and the dome members of the aligned packing elements to form a snap-lock connection with respective aligned dome members and post members of all of the aligned packing elements to thereby make the contact assembly.

44. The method of claim 43, the method further comprising:
(h)(2) removing the contact assembly from the fixture.

45. The method of claim 40, wherein there are eight alignment holes in the packing elements and eight alignment rods in the fixture.

* * * * *